(12) United States Patent
Brossman et al.

(10) Patent No.: US 6,498,661 B1
(45) Date of Patent: Dec. 24, 2002

(54) METHOD AND APPARATUS FOR RENDERING GRAYSCALES AT A FACSIMILE PRESENTATION DEVICE USING A CALIBRATED THRESHOLD MATRIX

(75) Inventors: Craig Duray Brossman; Arianne Therese Hinds, both of Boulder; Nenad Rijavec; Mikel J. Stanich, both of Longmont; Mark Andrew Stephens, Westminster; Raymond Glenn Wardell, Boulder, all of CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/277,056

(22) Filed: Mar. 26, 1999

(51) Int. Cl.[7] .................... G06K 15/02; H04N 1/405; H04N 1/32
(52) U.S. Cl. ................. 358/3.14; 358/3.23; 358/406; 358/468; 358/434
(58) Field of Search ................. 358/1.9, 1.15, 358/1.13, 534, 535, 434, 468, 456, 457, 460

(56) References Cited

U.S. PATENT DOCUMENTS

| | | | |
|---|---|---|---|
| 5,050,100 A | | 9/1991 | Damon et al. |
| 5,157,765 A | | 10/1992 | Birk et al. |
| 5,386,301 A | * | 1/1995 | Yuasa et al. .............. 358/455 |
| 5,537,550 A | | 7/1996 | Russell et al. |
| 5,550,957 A | | 8/1996 | Davidson, Jr. et al. |
| 5,566,278 A | | 10/1996 | Pantel et al. |
| 5,611,046 A | | 3/1997 | Russell et al. |
| 5,615,314 A | | 3/1997 | Schoenzeit et al. |
| 6,266,155 B1 | * | 7/2001 | Lee et al. .............. 358/1.9 |

OTHER PUBLICATIONS

J.R. Carlock and M.G. Lotz, "Kernel API Approach to Driving IPDS Printers", IBM Technical Disclosure Bulletin, vol. 35, No. 6, Nov. 1992.

T.C. Aden, B.C. Goodson, J.B. K, McMonale, J.M. Prusaitis and B.E. Trede, "Use of Page Records to Synchronize Printing While Converting", IBM Technical Disclosure Bulletin, vol. 35, No. 6, Nov. 1992.

* cited by examiner

Primary Examiner—Scott Rogers
(74) Attorney, Agent, or Firm—Gates & Cooper LLP

(57) ABSTRACT

A method, apparatus, article of manufacture for transmitting data to a facsimile presentation device is disclosed. In one embodiment of the invention, the method comprises the steps of receiving a presentation job comprising input data associable with at least one input grayscale value, retrieving at least one of a plurality of threshold matrices, each threshold matrix selected to control a grayscale rendering characteristic of the facsimile presentation device associated with the threshold matrix, applying the grayscale values to the retrieved threshold matrix to rasterize the input data, and transmitting the rasterized input data to the facsimile presentation device. This invention can be practiced in several embodiments, and permits the user to select the threshold matrix according to the presentation device and/or a selected presentation quality. In another embodiment of the invention, the apparatus comprises a means for receiving a presentation job having input data associable with at least one input grayscale value, means for retrieving at least one of a plurality of threshold matrices, each threshold matrix selected to control a grayscale rendering characteristic of the facsimile presentation device associated with the threshold matrix, means for applying the grayscale values to the retrieved threshold matrix to rasterize the input data, and means for transmitting the rasterized input data to the facsimile presentation device.

46 Claims, 25 Drawing Sheets

| 41 | 153 | 137 | 25 | 41 | 153 | 137 | 25 |
|---|---|---|---|---|---|---|---|
| 154 | 234 | 218 | 121 | 154 | 234 | 218 | 121 |
| 170 | 186 | 202 | 105 | 170 | 186 | 202 | 105 |
| 57 | 73 | 89 | 9 | 57 | 73 | 89 | 9 |
| 41 | 153 | 137 | 25 | 41 | 153 | 137 | 25 |
| 154 | 234 | 218 | 121 | 154 | 234 | 218 | 121 |
| 170 | 186 | 202 | 105 | 170 | 186 | 202 | 105 |
| 57 | 73 | 89 | 9 | 57 | 73 | 89 | 9 |

FIG. 4C

| | A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|---|
| 1 | 207 | 170 | 65 | 93 | 186 | 148 | 40 | 9 | 86 | 237 | 205 | 173 | 76 | 97 | 184 | 149 | 45 | 10 | 83 | 240 | 212 | 171 | 67 | 96 | 188 | 147 |
| 2 | 105 | 59 | 158 | 218 | 253 | 116 | 17 | 31 | 129 | 199 | 103 | 52 | 163 | 221 | 253 | 120 | 21 | 29 | 130 | 201 | 113 | 58 | 154 | 226 | 250 | 119 |
| 3 | 43 | 13 | 89 | 242 | 209 | 174 | 74 | 101 | 180 | 150 | 47 | 12 | 82 | 241 | 209 | 175 | 65 | 90 | 189 | 146 | 40 | 4 | 89 | 237 | 205 | 178 |
| 4 | 23 | 30 | 133 | 201 | 109 | 56 | 163 | 223 | 247 | 121 | 23 | 27 | 139 | 198 | 111 | 56 | 157 | 227 | 247 | 116 | 17 | 31 | 137 | 199 | 110 | 52 |
| 5 | 76 | 90 | 189 | 153 | 47 | 3 | 78 | 231 | 215 | 178 | 71 | 95 | 190 | 141 | 50 | 1 | 79 | 236 | 214 | 167 | 72 | 101 | 180 | 142 | 49 | 11 |
| 6 | 164 | 225 | 243 | 127 | 15 | 36 | 138 | 194 | 111 | 58 | 154 | 226 | 244 | 126 | 14 | 37 | 133 | 192 | 108 | 63 | 161 | 218 | 243 | 123 | 22 | 38 |
| 7 | 84 | 234 | 211 | 172 | 72 | 97 | 183 | 144 | 45 | 4 | 84 | 238 | 211 | 170 | 69 | 100 | 183 | 150 | 43 | 8 | 84 | 233 | 210 | 172 | 70 | 92 |
| 8 | 135 | 198 | 104 | 53 | 159 | 229 | 252 | 123 | 20 | 33 | 131 | 204 | 105 | 60 | 164 | 220 | 250 | 121 | 25 | 34 | 135 | 203 | 103 | 57 | 163 | 228 |
| 9 | 181 | 142 | 51 | 6 | 81 | 237 | 206 | 168 | 67 | 92 | 187 | 152 | 40 | 7 | 87 | 232 | 206 | 178 | 77 | 94 | 186 | 148 | 45 | 2 | 86 | 240 |
| 10 | 251 | 118 | 25 | 28 | 130 | 202 | 114 | 63 | 165 | 221 | 248 | 117 | 26 | 29 | 138 | 199 | 115 | 53 | 156 | 229 | 255 | 127 | 16 | 27 | 140 | 198 |
| 11 | 214 | 178 | 66 | 100 | 190 | 148 | 43 | 12 | 88 | 235 | 216 | 177 | 75 | 98 | 181 | 143 | 48 | 13 | 82 | 242 | 217 | 174 | 68 | 96 | 187 | 145 |
| 12 | 109 | 59 | 155 | 219 | 246 | 120 | 17 | 38 | 136 | 193 | 109 | 55 | 157 | 228 | 252 | 124 | 18 | 31 | 130 | 194 | 111 | 61 | 160 | 223 | 247 | 120 |
| 13 | 43 | 10 | 86 | 241 | 211 | 172 | 77 | 94 | 184 | 146 | 50 | 9 | 79 | 240 | 213 | 173 | 66 | 91 | 189 | 153 | 39 | 5 | 80 | 236 | 213 | 168 |
| 14 | 19 | 35 | 133 | 198 | 106 | 55 | 159 | 230 | 255 | 126 | 21 | 32 | 134 | 198 | 104 | 64 | 163 | 223 | 245 | 118 | 20 | 35 | 132 | 201 | 107 | 53 |
| 15 | 70 | 92 | 185 | 152 | 39 | 5 | 82 | 233 | 209 | 174 | 70 | 96 | 191 | 150 | 44 | 3 | 89 | 237 | 209 | 170 | 74 | 100 | 181 | 147 | 51 | 7 |
| 16 | 162 | 225 | 253 | 128 | 24 | 30 | 140 | 201 | 113 | 61 | 162 | 219 | 244 | 120 | 15 | 37 | 137 | 203 | 110 | 56 | 154 | 220 | 251 | 125 | 23 | 32 |
| 17 | 83 | 231 | 217 | 177 | 72 | 101 | 180 | 143 | 47 | 1 | 85 | 238 | 205 | 167 | 72 | 102 | 184 | 145 | 46 | 11 | 85 | 233 | 207 | 179 | 65 | 90 |
| 18 | 136 | 192 | 110 | 60 | 166 | 222 | 248 | 121 | 17 | 35 | 129 | 196 | 111 | 57 | 158 | 225 | 253 | 128 | 25 | 29 | 135 | 196 | 104 | 59 | 161 | 230 |
| 19 | 191 | 141 | 46 | 8 | 79 | 240 | 213 | 170 | 66 | 90 | 187 | 146 | 41 | 10 | 83 | 231 | 216 | 176 | 69 | 94 | 188 | 142 | 42 | 1 | 78 | 239 |
| 20 | 249 | 117 | 14 | 36 | 132 | 196 | 105 | 53 | 155 | 226 | 251 | 116 | 23 | 28 | 132 | 192 | 106 | 52 | 166 | 228 | 246 | 121 | 16 | 38 | 129 | 204 |
| 21 | 209 | 167 | 68 | 98 | 187 | 148 | 43 | 13 | 89 | 234 | 210 | 179 | 76 | 98 | 182 | 151 | 50 | 6 | 81 | 236 | 211 | 169 | 77 | 96 | 183 | 152 |
| 22 | 108 | 57 | 158 | 227 | 243 | 125 | 25 | 29 | 135 | 204 | 109 | 59 | 164 | 221 | 246 | 124 | 18 | 35 | 140 | 200 | 113 | 62 | 157 | 219 | 255 | 123 |
| 23 | 51 | 6 | 84 | 234 | 207 | 175 | 75 | 94 | 183 | 152 | 49 | 5 | 79 | 242 | 212 | 171 | 67 | 92 | 186 | 147 | 46 | 9 | 83 | 242 | 213 | 173 |
| 24 | 23 | 33 | 131 | 199 | 112 | 63 | 161 | 220 | 248 | 123 | 20 | 34 | 138 | 199 | 115 | 63 | 156 | 224 | 252 | 118 | 22 | 31 | 135 | 194 | 110 | 58 |
| 25 | 74 | 92 | 184 | 150 | 41 | 2 | 82 | 239 | 216 | 169 | 70 | 96 | 190 | 141 | 39 | 3 | 88 | 238 | 209 | 177 | 71 | 99 | 190 | 144 | 40 | 4 |
| 26 | 155 | 219 | 254 | 118 | 21 | 31 | 139 | 193 | 107 | 55 | 159 | 230 | 255 | 120 | 14 | 28 | 130 | 196 | 108 | 55 | 162 | 226 | 250 | 127 | 20 | 27 |
| 27 | 88 | 242 | 214 | 173 | 72 | 102 | 189 | 143 | 47 | 8 | 87 | 236 | 206 | 175 | 74 | 101 | 180 | 153 | 44 | 13 | 85 | 234 | 205 | 167 | 75 | 93 |
| 28 | 134 | 202 | 104 | 54 | 166 | 228 | 251 | 128 | 17 | 38 | 133 | 197 | 104 | 58 | 163 | 218 | 243 | 125 | 24 | 37 | 137 | 202 | 103 | 60 | 157 | 220 |
| 29 | 186 | 145 | 47 | 6 | 78 | 231 | 208 | 178 | 67 | 91 | 183 | 149 | 44 | 11 | 83 | 233 | 215 | 171 | 65 | 90 | 187 | 149 | 51 | 8 | 80 | 238 |
| 30 | 249 | 122 | 16 | 36 | 136 | 196 | 114 | 61 | 155 | 225 | 245 | 117 | 26 | 33 | 135 | 203 | 112 | 48 | 154 | 229 | 247 | 116 | 17 | 34 | 134 | 192 |
| 31 | 205 | 168 | 66 | 93 | 180 | 153 | 40 | 10 | 84 | 240 | 216 | 167 | 69 | 96 | 188 | 143 | 48 | 6 | 78 | 241 | 213 | 179 | 73 | 101 | 185 | 141 |
| 32 | 111 | 64 | 157 | 224 | 244 | 120 | 24 | 27 | 129 | 202 | 110 | 52 | 159 | 222 | 249 | 123 | 16 | 29 | 131 | 195 | 109 | 54 | 162 | 222 | 255 | 124 |

FIG. 4E

| | A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|---|
| 33 | 50 | 13 | 83 | 239 | 211 | 171 | 72 | 100 | 191 | 144 | 50 | 1 | 80 | 237 | 210 | 176 | 75 | 98 | 182 | 145 | 40 | 2 | 86 | 236 | 208 | 171 |
| 34 | 23 | 30 | 132 | 201 | 109 | 57 | 164 | 221 | 248 | 126 | 21 | 32 | 139 | 192 | 106 | 60 | 165 | 224 | 252 | 128 | 23 | 32 | 140 | 199 | 106 | 64 |
| 35 | 70 | 98 | 183 | 146 | 44 | 4 | 89 | 233 | 212 | 176 | 77 | 94 | 181 | 148 | 43 | 8 | 89 | 231 | 207 | 169 | 70 | 94 | 191 | 152 | 46 | 10 |
| 36 | 164 | 218 | 251 | 116 | 19 | 33 | 137 | 196 | 103 | 62 | 161 | 228 | 253 | 119 | 18 | 36 | 134 | 198 | 115 | 57 | 158 | 226 | 248 | 118 | 14 | 38 |
| 37 | 87 | 236 | 215 | 179 | 74 | 97 | 186 | 150 | 46 | 11 | 82 | 241 | 205 | 172 | 68 | 100 | 189 | 151 | 45 | 12 | 81 | 240 | 212 | 175 | 77 | 96 |
| 38 | 138 | 198 | 105 | 53 | 160 | 230 | 254 | 121 | 14 | 35 | 131 | 198 | 112 | 54 | 157 | 219 | 244 | 122 | 21 | 27 | 129 | 204 | 110 | 59 | 166 | 218 |
| 39 | 190 | 149 | 48 | 2 | 79 | 239 | 208 | 171 | 65 | 90 | 185 | 141 | 39 | 5 | 86 | 238 | 217 | 178 | 66 | 91 | 184 | 143 | 49 | 4 | 88 | 235 |
| 40 | 249 | 126 | 26 | 38 | 134 | 194 | 115 | 57 | 154 | 220 | 246 | 127 | 22 | 30 | 136 | 202 | 104 | 63 | 163 | 229 | 254 | 123 | 24 | 34 | 134 | 193 |
| 41 | 206 | 167 | 68 | 92 | 182 | 144 | 42 | 7 | 85 | 235 | 214 | 168 | 73 | 95 | 187 | 147 | 48 | 3 | 83 | 234 | 213 | 167 | 73 | 99 | 186 | 150 |
| 42 | 107 | 57 | 157 | 222 | 243 | 123 | 18 | 29 | 140 | 201 | 109 | 60 | 164 | 226 | 252 | 116 | 15 | 38 | 138 | 194 | 108 | 52 | 154 | 224 | 249 | 120 |
| 43 | 41 | 13 | 83 | 231 | 217 | 174 | 72 | 101 | 190 | 151 | 51 | 12 | 78 | 233 | 211 | 174 | 76 | 102 | 181 | 149 | 41 | 10 | 80 | 239 | 209 | 177 |
| 44 | 16 | 27 | 129 | 203 | 111 | 64 | 166 | 226 | 250 | 119 | 24 | 35 | 132 | 193 | 107 | 55 | 160 | 221 | 246 | 126 | 19 | 29 | 131 | 201 | 113 | 63 |
| 45 | 71 | 95 | 188 | 152 | 47 | 4 | 88 | 242 | 210 | 177 | 71 | 97 | 183 | 144 | 44 | 8 | 85 | 242 | 207 | 176 | 70 | 93 | 188 | 141 | 51 | 1 |
| 46 | 160 | 227 | 247 | 117 | 22 | 36 | 134 | 195 | 104 | 53 | 160 | 222 | 245 | 124 | 20 | 33 | 134 | 200 | 114 | 61 | 158 | 230 | 250 | 117 | 25 | 35 |
| 47 | 87 | 240 | 208 | 173 | 76 | 98 | 180 | 143 | 45 | 1 | 81 | 237 | 206 | 171 | 69 | 91 | 191 | 152 | 46 | 4 | 87 | 233 | 214 | 171 | 76 | 100 |
| 48 | 134 | 192 | 107 | 55 | 162 | 218 | 255 | 126 | 15 | 32 | 137 | 204 | 112 | 60 | 155 | 227 | 255 | 119 | 16 | 31 | 139 | 195 | 105 | 57 | 164 | 225 |
| 49 | 184 | 141 | 49 | 5 | 79 | 235 | 214 | 168 | 66 | 93 | 187 | 149 | 41 | 6 | 84 | 231 | 216 | 168 | 65 | 98 | 185 | 146 | 43 | 9 | 78 | 236 |
| 50 | 252 | 128 | 19 | 30 | 139 | 200 | 114 | 62 | 156 | 229 | 249 | 118 | 25 | 27 | 129 | 197 | 103 | 55 | 165 | 218 | 243 | 128 | 21 | 33 | 130 | 202 |
| 51 | 213 | 169 | 68 | 91 | 191 | 149 | 39 | 10 | 85 | 233 | 209 | 178 | 77 | 100 | 182 | 142 | 50 | 11 | 81 | 240 | 210 | 178 | 73 | 93 | 181 | 148 |
| 52 | 104 | 62 | 157 | 228 | 244 | 121 | 23 | 37 | 131 | 197 | 108 | 54 | 164 | 223 | 246 | 126 | 22 | 37 | 135 | 199 | 110 | 59 | 155 | 223 | 248 | 123 |
| 53 | 43 | 12 | 88 | 237 | 206 | 175 | 73 | 97 | 183 | 147 | 47 | 13 | 89 | 239 | 213 | 174 | 73 | 92 | 187 | 150 | 39 | 5 | 88 | 238 | 217 | 172 |
| 54 | 14 | 32 | 130 | 195 | 111 | 58 | 165 | 222 | 252 | 125 | 17 | 34 | 140 | 193 | 109 | 64 | 161 | 224 | 253 | 121 | 18 | 28 | 133 | 193 | 108 | 63 |
| 55 | 77 | 94 | 181 | 152 | 45 | 7 | 82 | 241 | 215 | 173 | 67 | 95 | 190 | 153 | 43 | 2 | 79 | 236 | 206 | 170 | 68 | 99 | 191 | 143 | 44 | 2 |
| 56 | 162 | 223 | 254 | 119 | 21 | 28 | 137 | 199 | 105 | 56 | 159 | 219 | 249 | 117 | 15 | 30 | 132 | 203 | 115 | 53 | 159 | 228 | 249 | 117 | 15 | 32 |
| 57 | 79 | 239 | 217 | 179 | 72 | 100 | 189 | 142 | 51 | 4 | 80 | 235 | 210 | 169 | 70 | 102 | 181 | 144 | 47 | 7 | 85 | 233 | 209 | 175 | 77 | 91 |
| 58 | 140 | 204 | 110 | 54 | 155 | 227 | 245 | 122 | 25 | 33 | 134 | 202 | 112 | 59 | 156 | 230 | 245 | 123 | 26 | 34 | 139 | 198 | 104 | 56 | 160 | 220 |
| 59 | 184 | 143 | 49 | 1 | 84 | 233 | 212 | 168 | 69 | 91 | 186 | 145 | 41 | 7 | 87 | 232 | 216 | 179 | 75 | 94 | 185 | 151 | 51 | 13 | 80 | 242 |
| 60 | 248 | 126 | 19 | 38 | 135 | 192 | 115 | 63 | 160 | 225 | 250 | 128 | 19 | 36 | 136 | 195 | 106 | 62 | 166 | 222 | 254 | 127 | 22 | 36 | 131 | 194 |

|    | AA  | AB  | AC  | AD  | AE  | AF  | AG  | AH  | AI  | AJ  | AK  | AL  | AM  | AN  | AO  | AP  | AQ  | AR  | AS  | AT  | AU  | AV  | AW  | AX  | AY  | AZ  |
|----|-----|-----|-----|-----|-----|-----|-----|-----|-----|-----|-----|-----|-----|-----|-----|-----|-----|-----|-----|-----|-----|-----|-----|-----|-----|-----|
| 1  | 42  | 6   | 84  | 236 | 213 | 175 | 72  | 101 | 180 | 141 | 51  | 9   | 78  | 238 | 205 | 171 | 73  | 99  | 181 | 143 | 40  |     | 6   | 231 | 213 | 176 |
| 2  | 19  | 28  | 139 | 202 | 114 | 59  | 155 | 218 | 243 | 116 | 20  | 27  | 130 | 192 | 110 | 52  | 165 | 222 | 248 | 124 | 18  | 28  | 129 | 203 | 103 | 61  |
| 3  | 74  | 99  | 183 | 144 | 47  | 1   | 81  | 234 | 208 | 167 | 76  | 96  | 189 | 146 | 44  | 4   | 87  | 235 | 216 | 178 | 65  | 90  | 184 | 148 | 48  | 9   |
| 4  | 158 | 222 | 247 | 126 | 14  | 30  | 132 | 196 | 103 | 54  | 163 | 229 | 247 | 122 | 15  | 32  | 138 | 200 | 106 | 64  | 154 | 228 | 243 | 116 | 14  | 31  |
| 5  | 78  | 231 | 211 | 170 | 65  | 90  | 187 | 152 | 44  | 12  | 89  | 240 | 214 | 177 | 67  | 95  | 185 | 152 | 46  | 8   | 84  | 242 | 210 | 170 | 72  | 99  |
| 6  | 129 | 193 | 106 | 56  | 164 | 226 | 252 | 121 | 18  | 34  | 140 | 203 | 113 | 62  | 159 | 219 | 253 | 127 | 21  | 36  | 134 | 194 | 113 | 59  | 164 | 218 |
| 7  | 190 | 151 | 41  | 5   | 87  | 241 | 216 | 173 | 71  | 100 | 182 | 148 | 41  | 3   | 83  | 232 | 209 | 168 | 75  | 101 | 189 | 144 | 42  | 2   | 82  | 237 |
| 8  | 251 | 117 | 24  | 35  | 137 | 200 | 111 | 62  | 159 | 222 | 249 | 125 | 25  | 38  | 131 | 195 | 109 | 58  | 161 | 224 | 251 | 120 | 25  | 33  | 139 | 199 |
| 9  | 208 | 177 | 76  | 96  | 185 | 147 | 50  | 7   | 80  | 235 | 206 | 174 | 73  | 91  | 188 | 142 | 51  | 13  | 79  | 238 | 206 | 174 | 70  | 94  | 181 | 150 |
| 10 | 113 | 64  | 156 | 220 | 245 | 127 | 20  | 31  | 135 | 194 | 105 | 59  | 156 | 226 | 244 | 117 | 19  | 30  | 137 | 203 | 107 | 53  | 156 | 230 | 245 | 127 |
| 11 | 47  | 10  | 81  | 237 | 212 | 175 | 68  | 98  | 190 | 144 | 45  | 11  | 86  | 241 | 212 | 172 | 68  | 97  | 183 | 149 | 45  | 4   | 88  | 234 | 212 | 172 |
| 12 | 18  | 30  | 133 | 197 | 107 | 57  | 161 | 228 | 255 | 120 | 15  | 28  | 133 | 201 | 115 | 55  | 165 | 221 | 249 | 122 | 16  | 27  | 130 | 198 | 114 | 63  |
| 13 | 71  | 102 | 182 | 141 | 40  | 3   | 86  | 233 | 210 | 168 | 74  | 94  | 180 | 153 | 40  | 6   | 82  | 235 | 217 | 177 | 76  | 91  | 191 | 143 | 39  | 7   |
| 14 | 166 | 225 | 253 | 124 | 26  | 37  | 130 | 203 | 112 | 52  | 164 | 220 | 250 | 122 | 23  | 36  | 135 | 198 | 103 | 61  | 159 | 224 | 254 | 124 | 24  | 37  |
| 15 | 88  | 232 | 206 | 171 | 75  | 92  | 186 | 151 | 49  | 9   | 78  | 238 | 215 | 176 | 71  | 101 | 189 | 146 | 47  | 10  | 84  | 239 | 208 | 167 | 72  | 98  |
| 16 | 138 | 192 | 115 | 61  | 155 | 218 | 246 | 118 | 21  | 33  | 139 | 193 | 107 | 64  | 154 | 227 | 247 | 128 | 20  | 34  | 140 | 192 | 108 | 57  | 161 | 229 |
| 17 | 191 | 149 | 45  | 13  | 81  | 241 | 217 | 177 | 66  | 100 | 184 | 146 | 46  | 1   | 89  | 231 | 205 | 169 | 65  | 97  | 185 | 151 | 50  | 2   | 86  | 232 |
| 18 | 243 | 116 | 14  | 28  | 135 | 199 | 104 | 57  | 160 | 229 | 252 | 125 | 16  | 32  | 129 | 196 | 110 | 58  | 163 | 218 | 251 | 116 | 14  | 31  | 132 | 202 |
| 19 | 215 | 174 | 73  | 96  | 181 | 144 | 42  | 5   | 87  | 234 | 207 | 171 | 77  | 90  | 187 | 141 | 41  | 8   | 80  | 237 | 211 | 179 | 70  | 93  | 180 | 142 |
| 20 | 108 | 54  | 159 | 223 | 251 | 128 | 18  | 36  | 131 | 197 | 114 | 60  | 162 | 223 | 244 | 119 | 26  | 29  | 133 | 204 | 113 | 52  | 157 | 225 | 243 | 127 |
| 21 | 48  | 10  | 85  | 236 | 209 | 168 | 71  | 97  | 190 | 149 | 51  | 12  | 81  | 242 | 212 | 175 | 69  | 95  | 182 | 147 | 43  | 11  | 82  | 241 | 216 | 174 |
| 22 | 22  | 33  | 138 | 195 | 111 | 63  | 165 | 225 | 246 | 120 | 24  | 28  | 138 | 201 | 108 | 55  | 158 | 228 | 249 | 125 | 21  | 36  | 136 | 199 | 106 | 56  |
| 23 | 67  | 101 | 188 | 147 | 45  | 2   | 83  | 239 | 211 | 179 | 69  | 94  | 184 | 152 | 44  | 3   | 85  | 235 | 215 | 172 | 74  | 102 | 191 | 150 | 48  | 7   |
| 24 | 163 | 227 | 248 | 119 | 25  | 30  | 133 | 203 | 106 | 53  | 156 | 219 | 255 | 124 | 17  | 38  | 137 | 197 | 104 | 60  | 166 | 220 | 254 | 122 | 18  | 34  |
| 25 | 89  | 231 | 207 | 177 | 76  | 92  | 186 | 142 | 39  | 6   | 86  | 232 | 217 | 167 | 73  | 99  | 188 | 143 | 49  | 4   | 88  | 233 | 206 | 169 | 68  | 92  |
| 26 | 132 | 200 | 105 | 56  | 154 | 222 | 253 | 126 | 20  | 35  | 135 | 192 | 112 | 63  | 164 | 224 | 246 | 118 | 23  | 32  | 130 | 193 | 115 | 64  | 156 | 227 |
| 27 | 181 | 149 | 49  | 12  | 79  | 235 | 214 | 171 | 65  | 102 | 180 | 147 | 49  | 11  | 78  | 238 | 208 | 173 | 66  | 91  | 183 | 145 | 39  | 12  | 80  | 239 |
| 28 | 244 | 122 | 15  | 37  | 140 | 195 | 113 | 60  | 162 | 229 | 243 | 116 | 14  | 30  | 131 | 203 | 108 | 59  | 154 | 229 | 251 | 120 | 16  | 27  | 132 | 199 |
| 29 | 216 | 174 | 69  | 99  | 184 | 153 | 46  | 9   | 82  | 241 | 205 | 173 | 71  | 93  | 186 | 151 | 42  | 9   | 83  | 240 | 214 | 179 | 77  | 97  | 187 | 153 |
| 30 | 114 | 52  | 165 | 228 | 248 | 118 | 18  | 29  | 129 | 200 | 103 | 58  | 157 | 221 | 252 | 128 | 19  | 33  | 140 | 197 | 110 | 54  | 160 | 218 | 244 | 128 |
| 31 | 42  | 3   | 87  | 240 | 208 | 169 | 72  | 90  | 190 | 145 | 41  | 1   | 89  | 236 | 213 | 176 | 75  | 100 | 190 | 148 | 46  | 2   | 86  | 232 | 210 | 167 |
| 32 | 26  | 30  | 131 | 204 | 107 | 62  | 158 | 219 | 251 | 124 | 26  | 36  | 137 | 194 | 115 | 52  | 161 | 225 | 245 | 123 | 25  | 37  | 136 | 202 | 103 | 58  |

| | AA | AB | AC | AD | AE | AF | AG | AH | AI | AJ | AK | AL | AM | AN | AO | AP | AQ | AR | AS | AT | AU | AV | AW | AX | AY | AZ |
|---|---|---|---|---|---|---|---|---|---|---|---|---|---|---|---|---|---|---|---|---|---|---|---|---|---|---|
| 33 | 67 | 93 | 189 | 145 | 48 | 6 | 85 | 234 | 215 | 176 | 74 | 98 | 182 | 141 | 45 | 7 | 80 | 234 | 207 | 170 | 70 | 95 | 180 | 142 | 43 | 5 |
| 34 | 156 | 224 | 250 | 121 | 21 | 35 | 138 | 196 | 111 | 54 | 166 | 230 | 247 | 119 | 21 | 28 | 134 | 200 | 106 | 58 | 165 | 223 | 249 | 116 | 17 | 31 |
| 35 | 83 | 232 | 217 | 178 | 75 | 97 | 183 | 151 | 44 | 12 | 81 | 231 | 209 | 169 | 69 | 93 | 184 | 153 | 49 | 13 | 84 | 239 | 215 | 175 | 72 | 92 |
| 36 | 136 | 197 | 113 | 56 | 162 | 226 | 245 | 127 | 16 | 27 | 132 | 203 | 107 | 60 | 156 | 220 | 253 | 126 | 15 | 31 | 129 | 192 | 114 | 62 | 156 | 230 |
| 37 | 180 | 147 | 39 | 8 | 78 | 237 | 210 | 167 | 67 | 95 | 186 | 148 | 48 | 5 | 88 | 242 | 217 | 177 | 65 | 102 | 188 | 146 | 41 | 9 | 89 | 237 |
| 38 | 243 | 125 | 23 | 29 | 132 | 201 | 105 | 63 | 154 | 223 | 255 | 122 | 24 | 38 | 136 | 195 | 111 | 64 | 158 | 226 | 250 | 122 | 26 | 35 | 139 | 198 |
| 39 | 205 | 170 | 65 | 102 | 185 | 142 | 50 | 2 | 86 | 239 | 207 | 179 | 77 | 100 | 191 | 144 | 39 | 3 | 82 | 236 | 211 | 172 | 75 | 97 | 185 | 150 |
| 40 | 103 | 54 | 157 | 229 | 253 | 116 | 20 | 33 | 140 | 192 | 114 | 58 | 161 | 227 | 244 | 118 | 19 | 33 | 138 | 204 | 105 | 53 | 163 | 219 | 243 | 119 |
| 41 | 43 | 13 | 85 | 242 | 211 | 175 | 73 | 92 | 188 | 146 | 41 | 8 | 79 | 233 | 212 | 172 | 71 | 90 | 182 | 149 | 51 | 7 | 79 | 231 | 205 | 174 |
| 42 | 17 | 31 | 138 | 196 | 111 | 60 | 165 | 222 | 246 | 123 | 14 | 30 | 131 | 200 | 103 | 55 | 165 | 221 | 247 | 124 | 21 | 27 | 132 | 199 | 111 | 60 |
| 43 | 69 | 90 | 189 | 145 | 46 | 5 | 81 | 233 | 214 | 170 | 68 | 98 | 180 | 152 | 46 | 10 | 86 | 239 | 208 | 167 | 67 | 95 | 186 | 141 | 44 | 12 |
| 44 | 161 | 220 | 246 | 126 | 22 | 37 | 129 | 204 | 106 | 52 | 157 | 218 | 250 | 127 | 23 | 35 | 133 | 198 | 115 | 61 | 155 | 228 | 255 | 128 | 14 | 30 |
| 45 | 83 | 231 | 216 | 172 | 71 | 99 | 182 | 151 | 44 | 12 | 87 | 241 | 205 | 174 | 75 | 94 | 185 | 143 | 43 | 4 | 84 | 234 | 214 | 177 | 77 | 101 |
| 46 | 136 | 198 | 107 | 56 | 159 | 228 | 251 | 119 | 26 | 32 | 135 | 197 | 112 | 63 | 161 | 230 | 253 | 116 | 16 | 32 | 135 | 195 | 106 | 57 | 158 | 224 |
| 47 | 184 | 153 | 40 | 7 | 89 | 238 | 208 | 178 | 76 | 94 | 187 | 141 | 50 | 1 | 80 | 235 | 216 | 176 | 72 | 99 | 191 | 150 | 49 | 9 | 81 | 237 |
| 48 | 254 | 121 | 15 | 27 | 133 | 194 | 114 | 60 | 164 | 225 | 248 | 122 | 17 | 28 | 139 | 193 | 108 | 59 | 159 | 223 | 248 | 122 | 22 | 36 | 140 | 202 |
| 49 | 206 | 168 | 66 | 95 | 190 | 147 | 48 | 8 | 82 | 236 | 215 | 169 | 65 | 102 | 189 | 148 | 41 | 11 | 88 | 241 | 210 | 169 | 66 | 93 | 180 | 144 |
| 50 | 112 | 53 | 156 | 219 | 244 | 127 | 20 | 36 | 137 | 202 | 108 | 58 | 154 | 220 | 243 | 125 | 25 | 37 | 129 | 203 | 110 | 53 | 166 | 218 | 244 | 125 |
| 51 | 49 | 12 | 85 | 241 | 213 | 173 | 73 | 91 | 185 | 145 | 39 | 5 | 85 | 231 | 207 | 173 | 70 | 91 | 182 | 146 | 47 | 2 | 83 | 232 | 206 | 179 |
| 52 | 24 | 38 | 140 | 199 | 104 | 62 | 160 | 230 | 255 | 117 | 23 | 34 | 132 | 200 | 105 | 54 | 163 | 227 | 254 | 121 | 20 | 32 | 136 | 196 | 104 | 56 |
| 53 | 71 | 102 | 187 | 142 | 42 | 3 | 79 | 234 | 211 | 176 | 69 | 97 | 181 | 153 | 49 | 9 | 79 | 238 | 212 | 177 | 75 | 98 | 187 | 151 | 44 | 13 |
| 54 | 163 | 226 | 252 | 118 | 18 | 29 | 130 | 193 | 110 | 53 | 166 | 224 | 249 | 120 | 15 | 29 | 138 | 194 | 113 | 64 | 155 | 225 | 248 | 118 | 15 | 33 |
| 55 | 82 | 232 | 210 | 179 | 67 | 98 | 183 | 151 | 47 | 11 | 88 | 242 | 210 | 168 | 74 | 100 | 188 | 142 | 42 | 7 | 86 | 237 | 217 | 171 | 68 | 95 |
| 56 | 136 | 204 | 113 | 55 | 157 | 221 | 246 | 124 | 16 | 31 | 139 | 197 | 115 | 61 | 158 | 219 | 245 | 127 | 18 | 30 | 131 | 201 | 109 | 59 | 164 | 222 |
| 57 | 182 | 152 | 48 | 10 | 87 | 239 | 206 | 171 | 77 | 94 | 191 | 145 | 42 | 2 | 84 | 234 | 214 | 174 | 68 | 93 | 185 | 147 | 51 | 3 | 80 | 234 |
| 58 | 245 | 125 | 22 | 34 | 134 | 197 | 106 | 64 | 161 | 227 | 250 | 128 | 22 | 36 | 133 | 204 | 104 | 58 | 160 | 230 | 252 | 120 | 24 | 38 | 139 | 193 |
| 59 | 215 | 168 | 69 | 95 | 189 | 148 | 40 | 6 | 77 | 232 | 217 | 178 | 66 | 92 | 185 | 150 | 48 | 12 | 81 | 240 | 207 | 169 | 77 | 102 | 191 | 153 |
| 60 | 108 | 61 | 165 | 229 | 254 | 122 | 26 | 37 | 135 | 200 | 109 | 57 | 156 | 224 | 254 | 118 | 26 | 34 | 136 | 196 | 112 | 55 | 162 | 220 | 247 | 123 |

FIG. 4H

|   | BA | BB | BC | BD | BE | BF | BG | BH |
|---|---|---|---|---|---|---|---|---|
| 1 | 67 | 97 | 180 | 145 | 50 | 3 | 81 | 232 |
| 2 | 158 | 227 | 250 | 124 | 16 | 27 | 130 | 197 |
| 3 | 78 | 236 | 205 | 167 | 69 | 96 | 185 | 147 |
| 4 | 133 | 197 | 109 | 52 | 155 | 221 | 253 | 119 |
| 5 | 187 | 142 | 44 | 5 | 87 | 239 | 215 | 175 |
| 6 | 254 | 121 | 24 | 37 | 137 | 193 | 114 | 62 |
| 7 | 216 | 179 | 76 | 92 | 190 | 151 | 40 | 8 |
| 8 | 105 | 56 | 159 | 226 | 246 | 125 | 18 | 32 |
| 9 | 50 | 11 | 85 | 232 | 208 | 169 | 69 | 98 |
| 10 | 19 | 29 | 131 | 202 | 111 | 58 | 162 | 223 |
| 11 | 66 | 102 | 184 | 144 | 45 | 1 | 79 | 238 |
| 12 | 166 | 221 | 252 | 117 | 15 | 34 | 139 | 195 |
| 13 | 80 | 242 | 213 | 176 | 74 | 96 | 188 | 148 |
| 14 | 137 | 194 | 105 | 54 | 158 | 228 | 244 | 122 |
| 15 | 186 | 153 | 47 | 13 | 89 | 235 | 205 | 170 |
| 16 | 247 | 120 | 19 | 32 | 130 | 204 | 115 | 64 |
| 17 | 210 | 172 | 67 | 90 | 182 | 146 | 49 | 3 |
| 18 | 112 | 62 | 154 | 219 | 255 | 126 | 22 | 27 |
| 19 | 42 | 5 | 78 | 240 | 215 | 175 | 76 | 96 |
| 20 | 25 | 29 | 134 | 197 | 103 | 53 | 160 | 223 |
| 21 | 75 | 101 | 188 | 149 | 40 | 11 | 87 | 238 |
| 22 | 162 | 223 | 250 | 121 | 16 | 38 | 139 | 201 |
| 23 | 86 | 236 | 207 | 170 | 65 | 97 | 181 | 145 |
| 24 | 138 | 194 | 109 | 61 | 165 | 230 | 245 | 123 |
| 25 | 183 | 143 | 46 | 1 | 81 | 233 | 211 | 179 |
| 26 | 247 | 117 | 26 | 31 | 129 | 196 | 114 | 59 |
| 27 | 212 | 176 | 73 | 95 | 190 | 151 | 43 | 10 |
| 28 | 110 | 56 | 159 | 221 | 253 | 126 | 20 | 28 |
| 29 | 50 | 8 | 87 | 235 | 217 | 172 | 70 | 99 |
| 30 | 21 | 35 | 137 | 204 | 105 | 52 | 162 | 225 |
| 31 | 67 | 101 | 182 | 148 | 41 | 3 | 80 | 237 |
| 32 | 163 | 224 | 250 | 119 | 14 | 37 | 140 | 192 |

FIG. 4I

|    | BA  | BB  | BC  | BD  | BE  | BF  | BG  | BH  |
| -- | --- | --- | --- | --- | --- | --- | --- | --- |
| 33 | 78  | 241 | 207 | 178 | 75  | 91  | 188 | 141 |
| 34 | 133 | 195 | 112 | 61  | 154 | 227 | 247 | 125 |
| 35 | 191 | 145 | 48  | 11  | 85  | 232 | 213 | 173 |
| 36 | 254 | 124 | 24  | 28  | 130 | 200 | 108 | 56  |
| 37 | 212 | 169 | 68  | 100 | 184 | 152 | 39  | 8   |
| 38 | 107 | 55  | 166 | 221 | 245 | 118 | 17  | 34  |
| 39 | 45  | 1   | 82  | 235 | 209 | 176 | 76  | 95  |
| 40 | 19  | 38  | 136 | 203 | 113 | 62  | 161 | 229 |
| 41 | 71  | 93  | 181 | 146 | 51  | 6   | 80  | 240 |
| 42 | 160 | 226 | 251 | 127 | 22  | 31  | 133 | 195 |
| 43 | 88  | 242 | 216 | 170 | 66  | 99  | 186 | 143 |
| 44 | 131 | 193 | 103 | 54  | 155 | 220 | 254 | 121 |
| 45 | 189 | 153 | 42  | 4   | 84  | 234 | 212 | 178 |
| 46 | 249 | 117 | 19  | 35  | 138 | 200 | 114 | 60  |
| 47 | 211 | 172 | 70  | 90  | 182 | 147 | 45  | 9   |
| 48 | 112 | 63  | 162 | 222 | 245 | 123 | 24  | 33  |
| 49 | 39  | 7   | 78  | 238 | 207 | 175 | 74  | 102 |
| 50 | 25  | 28  | 130 | 196 | 109 | 52  | 165 | 225 |
| 51 | 73  | 99  | 188 | 149 | 50  | 2   | 82  | 232 |
| 52 | 158 | 229 | 251 | 119 | 17  | 37  | 137 | 202 |
| 53 | 89  | 240 | 215 | 168 | 66  | 96  | 186 | 146 |
| 54 | 134 | 200 | 115 | 61  | 155 | 219 | 248 | 124 |
| 55 | 183 | 142 | 46  | 6   | 84  | 235 | 209 | 173 |
| 56 | 255 | 128 | 20  | 29  | 132 | 194 | 107 | 57  |
| 57 | 208 | 173 | 74  | 91  | 189 | 150 | 40  | 9   |
| 58 | 107 | 54  | 160 | 224 | 244 | 117 | 26  | 35  |
| 59 | 42  | 11  | 86  | 241 | 214 | 177 | 71  | 101 |
| 60 | 22  | 34  | 136 | 201 | 113 | 64  | 166 | 230 |

FIG. 4J

METHOD AND APPARATUS FOR RENDERING GRAYSCALES AT A FACSIMILE PRESENTATION DEVICE USING A CALIBRATED THRESHOLD MATRIX

CROSS-REFERENCE TO RELATED APPLICATIONS

This application is related to the following co-pending and commonly assigned patent application(s), all of which applications are incorporated by reference herein:

Application Ser. No. 09/100,055, filed on Jun. 19, 1998, by Ho Chong Lee, Mikel J. Stanich, and Jack L. Zable, entitled "HALF-TONE SCREEN CALIBRATIONS," now U.S. Pat. No. 6,266,155, issued on Jul. 24, 2001;

Application Ser. No. 09/100,487, filed on Jun. 19, 1998, by Ho Chong Lee and Mikel J. Stanich, entitled "PRINTER CALIBRATION SCHEME,"

Application Ser. No. 09/100,915 filed on Jun. 19, 1998, by Nenad Rijavec, entitled "CALIBRATING DIGITAL HALF-TONING ALGORITHMS WITH MULTIPLE PERSONALITIES," now U.S. Pat. No. 6,256,111, issued on Jul. 3, 2001;

Application Ser. No. 09/139,310, entitled "VIRTUAL PRINTER," filed on Aug. 24, 1998, now U.S. Pat. No. 6,266,150 by Craig D. Brossman, Arianne T. Hinds, Nenad Rijavec, Mark A. Stephens, and Raymond G. Wardell, Application Ser. No. 09/139,043, entitled "IPDS VIRTUAL PRINTER WITH ASYNCHRONOUS JOB AND DEVICE STATUS," filed on Aug. 24, 1998, by Craig D. Brossman, Arianne T. Hinds, Nenad Rijavec, Mark A. Stephens, and Raymond G. Wardell, Application Ser. No. 09/282,024, filed on Mar. 26, 1999, entitled "METHOD AND APPARATUS FOR RENDERING GRAYSCALES AT A FACSIMILE PRESENTATION DEVICE USING A CALIBRATED TRANSFORM," by Craig D. Brossman, Arianne T. Hinds, Nenad Rijavec, Mikel J. Stanich, Mark A. Stephens, and Raymond G. Wardell.

BACKGROUND OF THE INVENTION

1. Field of the Invention

The present invention relates to systems and methods for reproducing documents and other files, and in particular to a method and system for the reproduction of grayscales at remote devices such as facsimile machines.

2. Description of the Related Art

Facsimile machines are widely used in business today. Unfortunately, while most documents today are reproduced with a resolution of 300 dots per inch (DPI) or more, transmission bandwidth and other factors limit fax machines to the transmission and reception of images of considerably less resolution, usually in the order of either 204×196 or 204×98 DPI. This reduction in image resolution often results in a received transmission that is distorted with Moire patterns, jagged edges on text and images, severely limited dynamic range, reduced contrast and blurred. This can make the faxed document difficult or impossible to read. As a result, high quality documents cannot be transmitted with confidence that they will be reproduced correctly by the receiving facsimile machine.

SUMMARY OF THE INVENTION

The present invention discloses a method, apparatus, and an article of manufacture for transmitting data to a presentation device for receiving facsimile transmissions.

According to one embodiment of the invention, the method comprises the steps of receiving a presentation job comprising input data associable with at least one input grayscale value, retrieving at least one of a plurality of threshold matrices, each threshold matrix selected to control a grayscale rendering characteristic of the facsimile presentation device associated with the threshold matrix, applying the grayscale values to the retrieved threshold matrix to rasterize the input data, and transmitting the rasterized input data to the facsimile presentation device. In one embodiment of the present invention, the step of transmitting the rasterized input data to the presentation device comprises the steps of reducing the rasterized input data to an intermediate format being one of a number of widely supported formats, generating device-specific data and device-specific control information for the presentation device based on the intermediate format and control information associated with the input data, and transmitting the device-specific data and the device-specific control information to the presentation device. This invention can be practiced in several embodiments, and permits the user to select the threshold matrix according to the presentation device and/or a selected presentation quality.

According to another embodiment of the invention, the apparatus comprises a means for receiving a presentation job having input data associable with at least one input grayscale value, means for retrieving at least one of a plurality of threshold matrices, each threshold matrix selected to control a grayscale rendering characteristic of the facsimile presentation device associated with the threshold matrix, means for applying the grayscale values to the retrieved threshold matrix to rasterize the input data, and means for transmitting the rasterized input data to the facsimile presentation device. In one embodiment, the apparatus comprises a facsimile machine, and the means for receiving a presentation job comprises a scanner. In another embodiment, the apparatus is comprised of a computer executing software instructions to translate a document, image, or other computer file into rasterized input data for transmission to a presentation device.

The foregoing uses calibration curves and threshold arrays which are specifically designed to enhance the output quality of the facsimile transmission and reproduction, and enable users to provide their outgoing faxes with high quality images and text that can be accepted by a receiving fax machine with the image fidelity intact. The result is that the user is able to transmit higher quality images that are more visually appealing, easier to read, and convey the information content of the original.

BRIEF DESCRIPTION OF THE DRAWINGS

Referring now to the drawings in which like reference numbers represent corresponding parts throughout:

FIG. 4C is a diagram illustrating how halftone cells can be aggregated or tiled together;

FIGS. 4E–4J illustrate the turn-on sequence for an arrangement of 3600 PELs in 60×60 matrix defined by thirty-six 10×10 halftone cells;

DETAILED DESCRIPTION OF THE PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
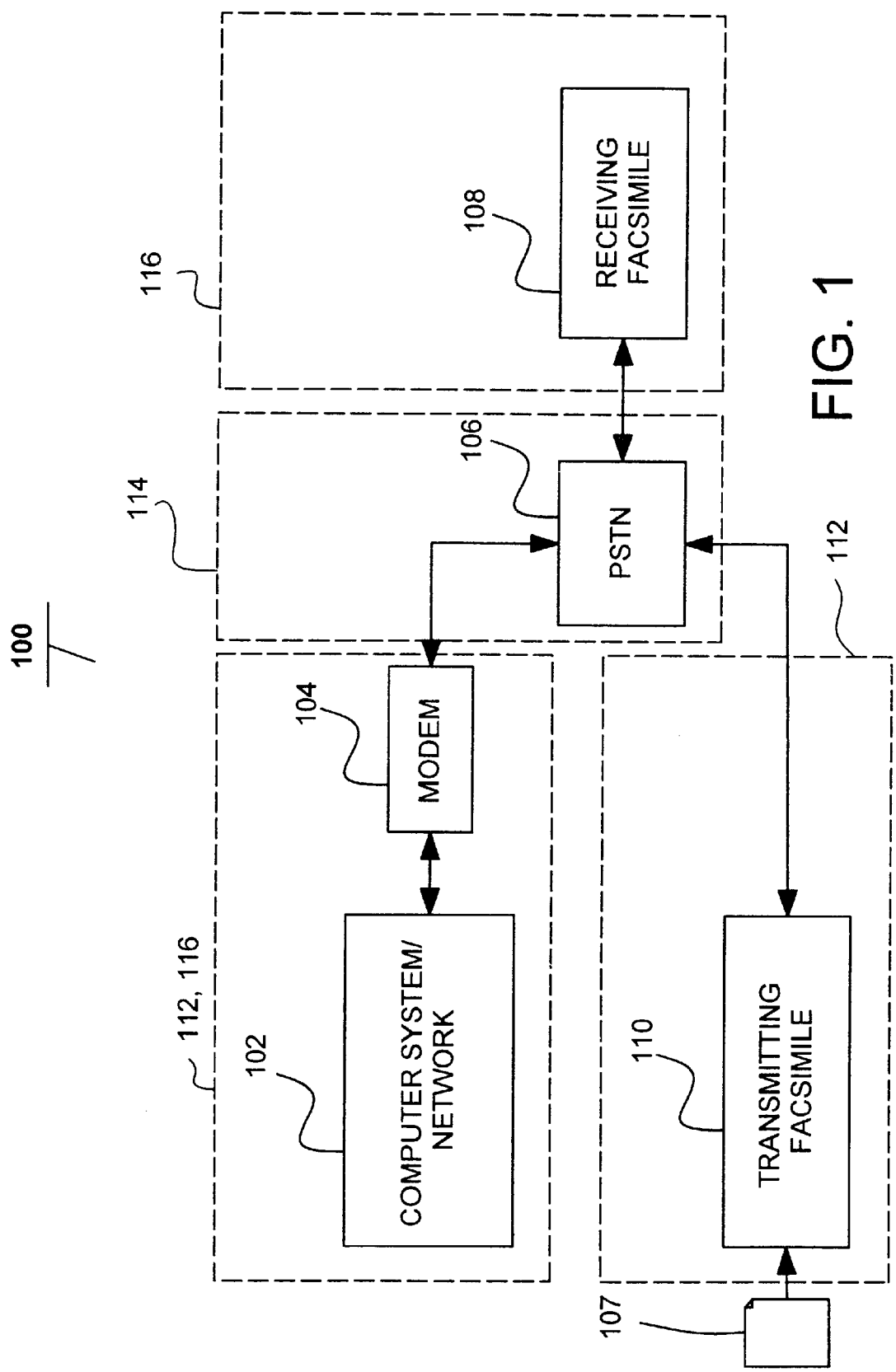
FIG. 1 is a block diagram showing an exemplary hardware environment for practicing the present invention.

FIG. 1 is a diagram presenting an exemplary depiction of a hardware environment for a presentation system 100. The environment 100 comprises a facsimile transmitting device 112 communicatively coupled to a facsimile presentation device 116 via a communications device 114.

In a first embodiment, the facsimile transmitting device 112 comprises a transmitting facsimile 110, the communications device comprises the public switched telephone network (PSTN) 106 or similar medium such as a cellphone network, and the facsimile presentation device 116 comprises a receiving facsimile 108. Typically, the transmitting facsimile 110 comprises a scanner for scanning a presentation job in the form of a document having grayscale content to convert the symbols and images on the document to signals. Scanning can be accomplished by a various techniques well known in the art, including rectilinear scanning, array scanning, multispot scanning, using both mechanical sweep and electronic scanners. The signals correspond to the diffuse reflectances of light from a sequence of elemental areas on the document 107. The elemental area is defined by an aperture through which light must pass before it induces a signal current in an associated light-sensor. The standard elemental area for Group 3 resolution is a rectangle $\frac{1}{208}$ inches wide by $\frac{1}{196}$ inches high. Other common elemental areas have dimensions ranging from 20 to 200 percent of these dimensions. The transmitting facsimile 110 also comprises a driver to convert the signals according to one of many standard transmission protocols (including International Telephone and Telegraph Consultative Committee (CCITT) Groups 1, 2, 3, or 4) for transmission to the receiving facsimile 108.

The information derived from the scanning process is then encoded, modulated and transmitted to the receiving facsimile in accordance with techniques well known in the art.

The information content of the received signal is used to control the placement of marks on the recording media in the facsimile presentation device so that a visually appealing reproduction of the original document 107 is reproduced. Typically, this is accomplished by applying electricity, heat, light, ink, or pressure to a recording media. Elemental areas of the media are marked individually by rectilinear, array, or multi-spot scan using a marking transducer. Different types of recording media that can support grayscale rendering are used, including electro-sensitive paper, thermal paper, electrostatic paper, ink jet, pressure, electrolytic, dry silver paper, thermal transfer, xerography, and film.

Typically, the elemental areas of the media referred to as picture elements (PELs) are rendered by the presentation devices 108 as black and white only, and grayscales are achieved by varying the ratio of black area to white area within a single pixel.

One method for achieving this result is the charge-subtraction method, in which a single stylus lays down charge, and after a small displacement, the stylus polarity is reversed. This causes some of the charge to be reabsorbed by the stylus, leaving only a half-moon shape when toned. The timing of the reabsorption is varied to control the thickness of the half-moon dot to achieve the intended gray level.

Another method for achieving this result is a method (often referred to as a super-pixel method) in which four or more devices are used to reproduce a super pixel of 16 PELs in a 4×4 matrix. Varying the turn-on threshold and pattern of the PELs within the matrix allows the rendering of white, black, and a number of grayscales.

Group 2 facsimile machines are capable of transmitting and receiving grayscale information according to a vestigal sideband (VSB) amplitude modulated (AM) phase-modulated signal. With such machines, the grayscale information may be transmitted to the receiving facsimile 108, where a digital halftoning process is used to render the grayscales on the printed page. Group 3 facsimile machines typically transmit image data in black and white values only. Hence, after scanning, the transmitting facsimile 110 (rather than the receiving facsimile 108) creates a rasterized version of the image (which includes a bi-level input for each PEL) and transmits the rasterized version of the image to the receiving facsimile 108, where the grayscale values are reproduced by completing the digital halftoning process. Further details of facsimile transmission can be found in the Electrical Engineers' Handbook, by Donald G. Fink and Donald Christiansen, published 1989 by McGraw-Hill, pp. 20–106 through 20–127, which is hereby incorporated by reference herein.

In a second embodiment, the facsimile transmitting device 112 comprises a computer system/network 102 in communication with the receiving facsimile 108 via a modem 104 and the PSTN 106. In this embodiment, the presentation job is described by a file under process by a personal computer or other processor. The computer system/network 102 uses the file to generate signals describing the images and grayscale content of the document 107 according to the transmission protocols as described above. These signals are transmitted to the receiving facsimile 108 via the PSTN 106 and the modem 104, where they are demodulated, decoded, and used to present an image of the document 107.

In yet another embodiment of the present invention, facsimiles received from the transmitting facsimile device 112 are received by the computer system/network 102 and presented to the user on facsimile presentation devices 116 in the computer system/network. Hence, the computer system 102 can operate both as a facsimile transmitting device 112 and a facsimile presentation device 116.

Figure 2:
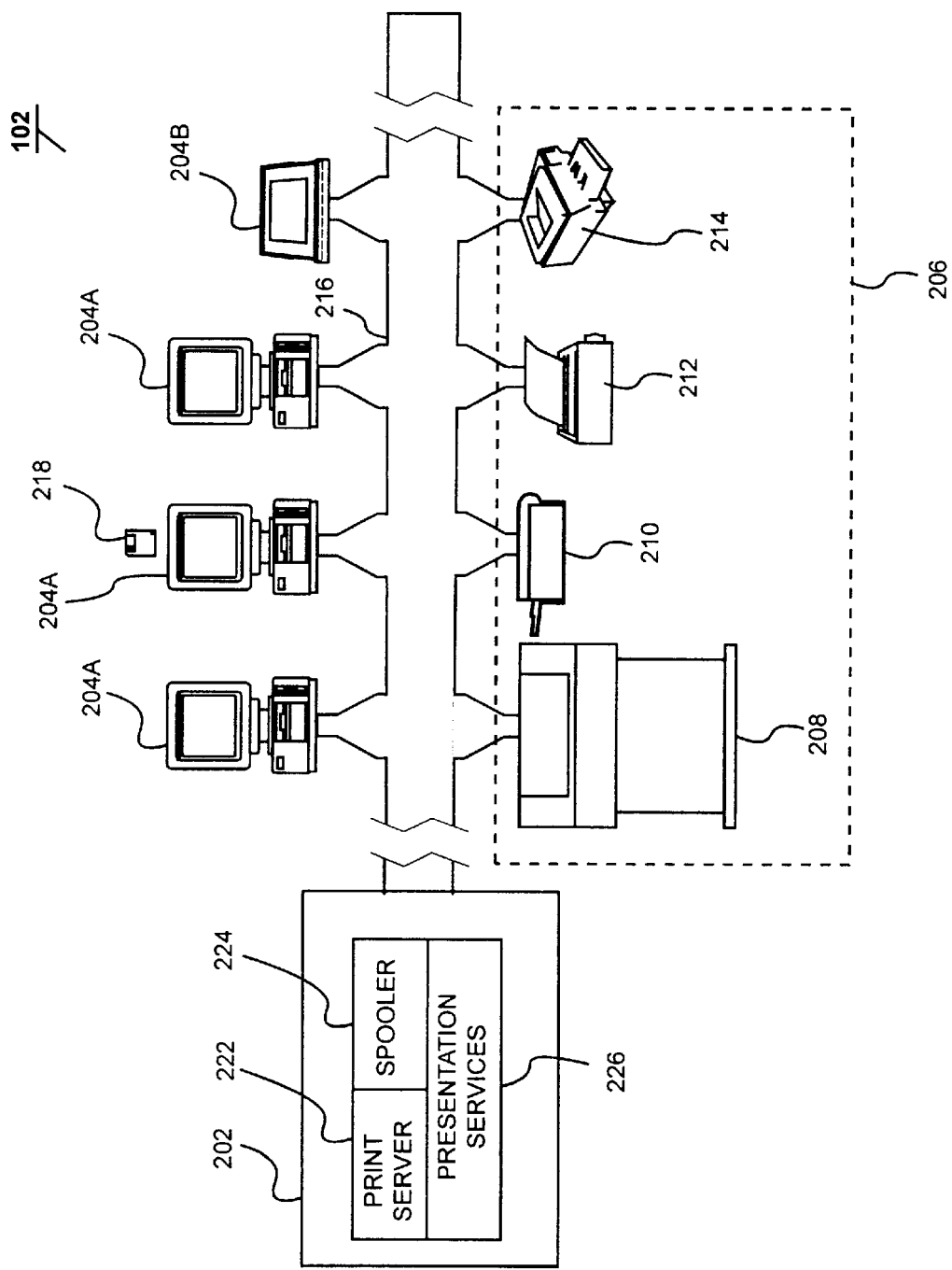
FIG. 2 is a diagram depicting an exemplary embodiment of a computer system/network.

FIG. 2 is a diagram depicting an exemplary embodiment of the computer system/network 102. The computer system/network 102 comprises one or more computers 204 including desktop computers 204A and notebook computer 204B, operatively coupled to one or more server computers 202 via a network connectivity 216 (e.g. token-ring, local area network (LAN), Ethernet, wide area network (WAN) or system complying with the TCP/IP). The computer system/network 102 also comprises a plurality of presentation devices 206 (i.e. high-speed printer 208, laser printer 210, impact printer 212, or network facsimile 214) that can be used to present an image of a facsimile for viewing. When used to reproduce a facsimile, these devices operate as a facsimile presentation device 116.

Computers 204 include an input device (e.g., keyboard, mouse pointing device, voice activated input device, touch sensitive display, etc.), and a data communication device (e.g. modem, network interface, etc.) to interface with the network 102.

Computers 204 operate under control of an operating system stored in a memory, and interfaces with the user to accept inputs and commands and to present results through a graphical user interface (GUI) module. The instructions performing the GUI functions can be resident or distributed in the operating system, a computer program, or implemented with special purpose memory and processors. The computers 204 may also implement a compiler which allows an application program written in a programming language such as COBOL, C++, FORTRAN, or other language to be translated into processor readable code. After completion, the application accesses and manipulates data stored in the memory of the computers 204 using the relationships and logic that was generated using the compiler.

In one embodiment, instructions implementing the operating system, the computer program, and the compiler are tangibly embodied in a computer-readable medium, e.g., a data storage device, which could include one or more fixed or removable data storage devices, such as a zip drive, floppy disc drive and floppy disk 218, hard drive, CD-ROM drive, tape drive, etc. Further, the operating system and the computer program are comprised of instructions which, when read and executed by the computers 204, causes the computers 204 to perform the steps necessary to implement and/or use the present invention. Computer program and/or operating instructions may also be tangibly embodied in or obtained from memory and/or data communications devices, thereby making a computer program product or article of manufacture according to the invention. As such, the terms "article of manufacture" and "computer program product" as used herein are intended to encompass a computer program accessible from any computer readable device or media.

The server computer 202 includes a print server 222, a spooler 224 for controlling the spooling of data files, and presentation services 226 for generating appropriate commands to drive one or more of the presentation devices 206, including printers 208–212 or network facsimile 214.

The print server 222 may also include other components that are not shown for performing basic tasks, such as monitoring and configuring attached printers, and providing print job management. When data is to be reproduced by displaying it on one of the presentation devices 206 or the displays coupled to computers 204, the data is sent to the print server 222 via the LAN 116. The print server 222 also typically converts the data stream containing the print data to a data stream supported by presentation devices 206.

Data representing an image comprised of grayscale level print commands is provided to the print server 222 via the LAN 216. The print server 220 may then apply a transfer function to the grayscale input values. This transfer function modifies the grayscale input values to account for presentation devices 206 non-linearities such as printer 208–214 or network facsimile 214 dot gain. Next, the print manager performs a halftoning process on the modified input values and creates a rasterized version of the image, which includes a bi-level input for each of the PELs in the presentation device(s) 206. The rasterized version of the image is eventually transmitted to the facsimile presentation device 116 such as one or more of the presentation devices 206 or the receiving facsimile 108.

Typically, each different facsimile presentation device 116 (such as presentation devices 206 or receiving facsimiles 108) each respond to different data streams. For instance, the printers 208–214 may accept well-known standard protocols such as the Intelligent Printer Data Stream (IPDS) or Post-Script. Further, as described above, Group 2 and Group 3 facsimile machines accept data in different forms and in different protocols. To account for these variations, the print server 222 converts between the various input data streams that may be received and accepted by each of the presentation devices 206.

Figure 3:
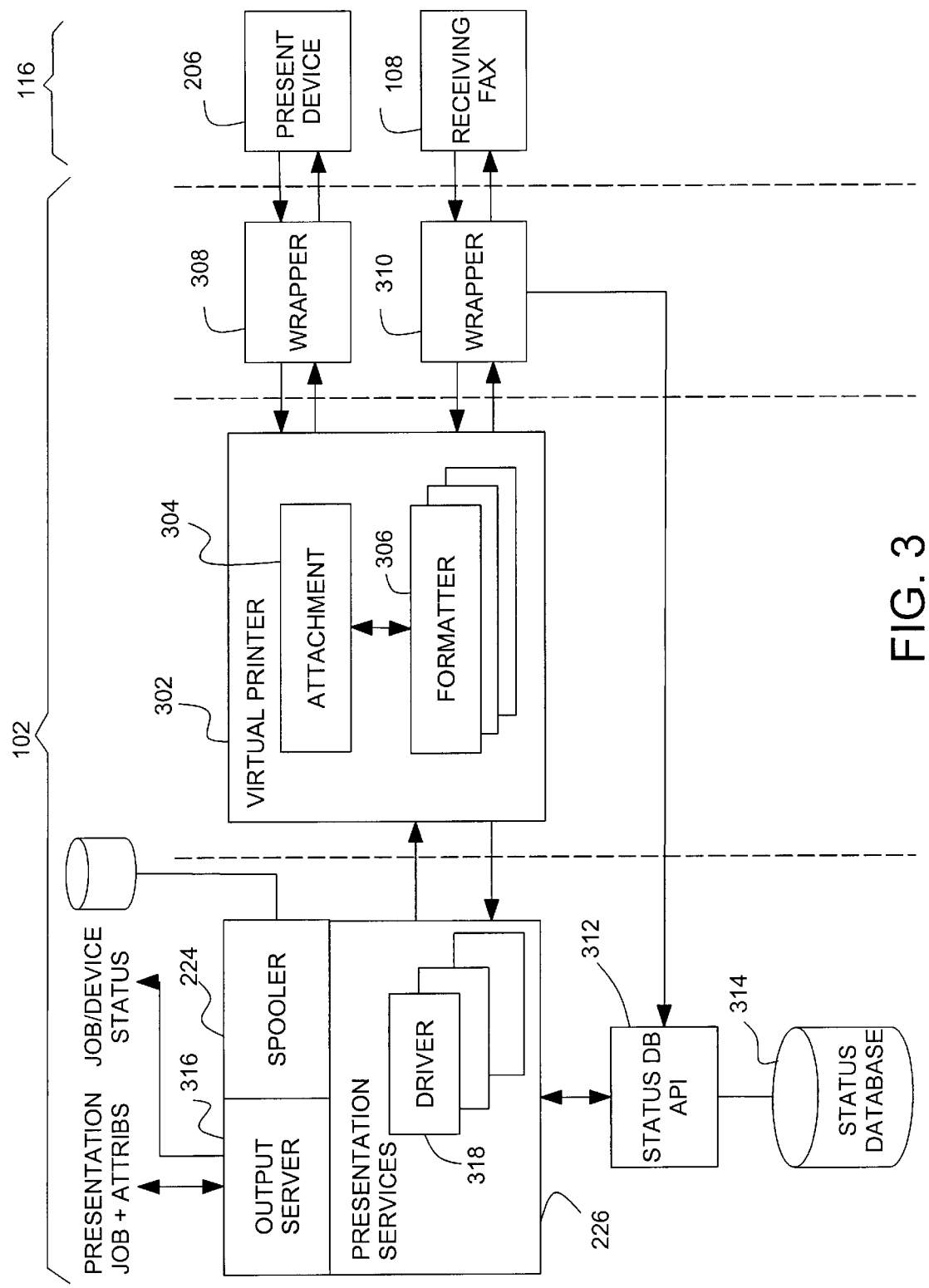
FIG. 3 is a block diagram illustrating the present invention practiced with a virtual printer.

FIG. 3 is a block diagram illustrating the present invention practiced with a virtual printer 302. One feature of this embodiment is the ability of the architecture to retain content while gaining runtime efficiencies. For example, processing that is typically performed by presentation device drivers, i.e., the generation of device dependent data and presentation controls, is pushed down stream to a point at which the data stream is very simple and therefore more easily transformed to a device dependent format. Additionally, by decoupling device dependencies from the output server 316 in the manner described below, efficiencies are also achieved during development, as less code is required in order to provide support for new devices. Enhancements to the architected data streams or print servers are inherited by existing devices for which the virtual printer acts as a proxy. Another important characteristic to be pointed out in the software architecture of the present embodiment is the simple, well-defined interfaces between components of the architecture. Of course, various other features and advantages will be recognized by those of ordinary skill in the art from following description.

According to the embodiment depicted, a presentation environment architecture includes the following components: a output server 316, a virtual printer 302, one or more wrapper functions 308, 310, one or more facsimile presentation devices 116 (such as presentation device 206 or receiving facsimile 108), a status database application programming interface (API) 312, and a status database 314. In various embodiments, more or less components may be employed by combining or excluding one or more of the above-referenced components or adding additional components. Importantly, the components may reside on the same computer system or be distributed across several different computer systems on a local area network, for example. FIG. 3 illustrates one possible distribution of components in which the dashed lines represent a physical separation between components. When the components are physically separated, bi-directional communication links may be established and maintained among the components via a TCP/IP, sockets based interface, for example.

In one embodiment, the output server 316 may be included in a current or future release of INFOPRINT® Manager, Print Services Facility (PSF), e.g., PSF/MVS or PSF/400, or other IPDS enabled print server. In the present example, the output server 316 receives presentation jobs (e.g., print jobs, fax jobs, and other output jobs) and user-specified job attributes from a workstation, for example, and returns job and/or device status. The output server 316 may support outputting the data received to a plurality of heterogeneous facsimile presentation devices 116 by wrapping, in an object container, destination control information (e.g., an email address for sending the presentation job to an email server, a phone number for sending the presentation job to a fax server) provided in the user-specified job attributes. The object container may then proceed transparently through the output server processing and continue down stream where it may be used at the appropriate point during the processing of the presentation job in the virtual printer 302 or wrappers 308, 310.

Those skilled in the art will recognize the wrapper as a generalization of a print mechanism that no longer needs to be physically contained within a printer. Importantly, forms of the verbs "print" and "output" in the context of this application, refer broadly to the act of communicating a data stream containing data that is destined for a presentation device or something capable of re-transmitting the job to a presentation device. These definitions include, but are not limited to, the traditional meaning of print, e.g., sending data to a printer in order to produce character shapes, graphics pictures, images, or other symbols with ink, toner, or the like on a physical medium, such as paper. According to these definitions, data may be said to be "printed" or "output" to a fax server or a pager, for example.

Returning to the embodiment depicted, the output server 316 includes a spooler 224 and presentation services 226. The presentation services 226 may include one or more drivers 318 configured to generate commands suitable for driving various presentation devices, one of which is configured to interface with the virtual printer 602.

In the preferred embodiment, the presentation device control protocol exchanged between the output server 316 and the virtual printer 602 is the Intelligent Printer Data Stream (IPDS). IPDS is an architected, bi-directional printer data stream that contains both data and controls defining how the data is to be presented. Additionally, the IPDS architecture provides an extensive acknowledgment protocol at the data stream level that provides for exchange of query-reply information and allows the return of detailed exception information. IPDS data streams are independent of the carrying communications protocol. This allows the transmission of the same data stream to presentation devices attached to channels, controllers, local area networks, and any other type of networking link that supports the transparent transmission of data. IPDS transfers data and controls through commands that describe the presentation of data and provide for dynamic management of resident fonts and of downloaded resources, such as overlays, page segments, and loaded fonts. Additionally, IPDS commands allow control of device functions such as duplexing, media-bin selection, and output finishing. Further background and information regarding the IPDS architecture may be found in a publication entitled, "Intelligent Printer Data Stream Reference," Order Number S544-3417, published Mar. 15, 1996, which is available from IBM Printing Systems Company of Boulder, Colo., which is hereby incorporated by reference herein.

Importantly, while this embodiment is described with reference to a output server 316 supplying a printer data stream, such as IPDS, to the virtual printer 302, the present invention is not limited to receipt of a printer data stream from any particular type of device. In alternative embodiments, the data stream may be received directly or indirectly from a workstation or other data stream generator or may be read from a scripted file, for example.

In the embodiment depicted, the virtual printer 302 includes an attachment layer 304 and one or more formatters 306. The attachment layer 304 and one or more of the drivers 318 establish a bi-directional communication link between the output server 316 and the virtual printer 302 through which communication may occur. Typically, the output server 316 will provide logical pages of arbitrarily complex source data embedded in a data stream and corresponding user-specified job attributes (potentially for each logical page). The source data may include, for example, text, image, graphics and/or other embedded objects, such as sound or video. At any rate, responsive to the data stream, the attachment layer 304 may provide the output server 316 with such things as page counters (e.g., received page count, committed page count), status and other error conditions relating to the processing of the data stream by the virtual printer 302. Embodiments of the virtual printer architecture may provide various levels of job status, thereby allowing the output server 316 to recover from certain data stream and device errors, for example.

Preferably, to leverage existing code, the attachment layer 304 may receive an architected, bi-directional printer data stream from an existing printer driver. In one embodiment, the virtual printer 302 is capable of acting like a particular presentation device, such as one of many different IPDS printers (e.g., INFOPRINT® 60 or INFOPRINT® 4000), by performing the bi-directional communications as the particular printer would. In this manner, the virtual printer 302 may act as a proxy for presentation devices that may or may not natively support the data stream received by the virtual printer 302. Ultimately, the output server 316 (or other data stream generator) is essentially made to believe that it is communicating directly with a printer rather than an intermediate entity behind which a heterogeneous group of presentation devices may reside.

The attachment layer 304 employs one or more formatters 306, which may operate in parallel, to reduce the data stream received from the output server 316 to a simple format. The formatters 306 receive the data stream from the attachment layer 220 and convert the data stream to a widely supported, simple format, such as a bit map, text, a frame of video, or one of many other well-defined interchange formats, thereby facilitating subsequent re-packaging in a device-dependent manner by the appropriate wrapper function 308 and 310. In embodiments employing presentation devices that accept imaged data, at least one of the formatters 306 may comprise a rasterizer. In this case, if the rasterized image is bi-level it can be compressed, for example, via International Telecommunications Union-Telecommunications Standardization Sector MU-TSS) T.6 Group 4 two-dimensional coding standard for facsimile. Other compression algorithm or formats may be used. For example, the rasterizer may convert to other image formats to accommodate color. Then, the resulting image data and associated controls may be packaged by the wrapper function 308, 310, one presentation unit at a time to build a job for submission to a presentation device. The presentation unit is a block of data whose size is device dependent. For example, the presentation unit for a pager might be a screen full of text, while the presentation unit for a printer may be one or two sides of a sheet. In other embodiments, which may communicate with text-based presentation devices such as pagers, at least one of the formatters 306 may comprise a text extractor. Numerous alternative formatters are possible depending upon the characteristics of the presentation devices supported.

The wrapper functions 308, 310 abstract the device dependent details from the virtual printer 302. In general, wrapper functions receive data in a device independent format, transform it into a device-specific format, and drive the appropriate presentation device. Importantly, depending upon the particular implementation wrappers may be defined for a particular type of presentation device (e.g., a INFOPRINT® 60 IPDS printer or a LOTUS NOTES® e-mail server), for presentation device families (e.g., fax servers, email servers, POSTSCRIPT® printers, PCL printers, IPDS printers), or for various groupings of presentation device families.

In one embodiment, the wrapper functions 308, 310 include a device independent portion and a device dependent portion (not shown). The device independent portion of the wrapper receives control object containers and data from the formatter in a fixed format and is essentially the same for each wrapper function 308, 310. However, the device dependent portion has knowledge of the data stream supported by the presentation devices with which it is associated, knowledge of how to apply the control information to the formatted data, knowledge of how to interpret and utilize the destination control information supplied to the output server 316, knowledge of the job ticket format required, if any, for job submission to its presentation devices, etc.

The wrapper functions 308, 310 essentially receive device independent material, e.g., the formatted data from the formatters 306 and control information that describes the presentation of the data, and makes it device dependent based upon the control information and/or characteristics of the targeted presentation device. For example, the device dependent portion of the wrapper function may parse the destination control information and residual control information from the data stream and perform image operations, such as scaling, cropping and resolution modification, to accommodate various features and limitations of the targeted presentation device.

Alternatively, depending on the specificity of the wrapper, it may be able to make the formatted data device dependent without reference to the destination control information. Importantly, as a result of device dependencies only being encoded in a portion of the wrapper and in the user specified destination control information, virtual printer support for new presentation devices may be accomplished by simply providing new wrapper functions and support for any new user-specified job attributes to be contained in the object containers.

As will be described further below, the status database application programming interface (API) 312 tracks job and device status for the output server 316. The status database API 312 may run independent of the output server 316 as a daemon process or other independent processing thread or process and may employ a status database 314 to store the job status information, (e.g., stacked page count) and device status information (e.g., device failures, such as paper jam, out of toner, etc.). In one embodiment, communications between the status database API 312, the output server 316, and other processes may be accomplished via remote procedure calls.

Whether the data is transmitted from the transmitting facsimile 110 or the computer system/network 102, digital halftoning techniques are used to record and render gray levels at the facsimile presentation devices 116. As described above, one of the techniques used by some embodiments of the facsimile presentation device 116 use sixteen PELs in a four-by-four matrix. Varying the turn on threshold and pattern of the PELs within the matrix allows the rendering of white, black, and a number of grayscales.

Figure 4A:
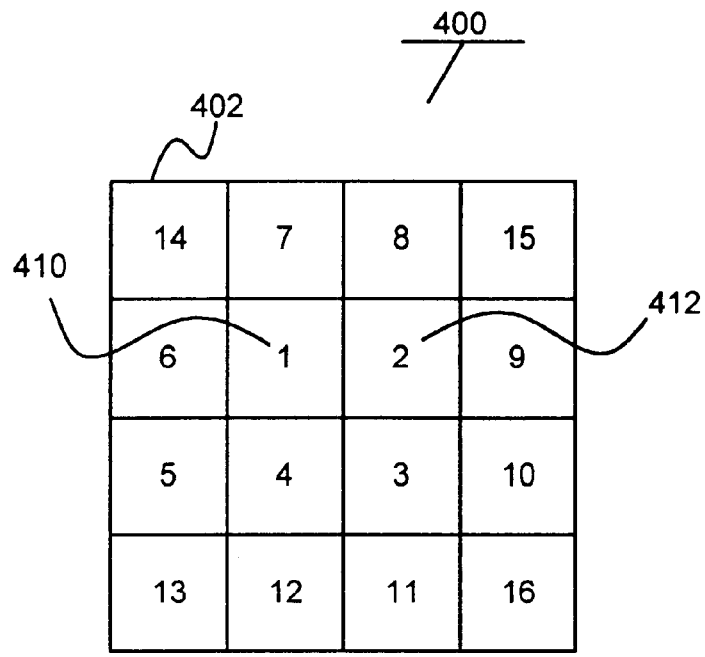
FIG. 4A is a diagram showing the structure of a threshold array of a halftone cell.

FIG. 4A is a diagram showing a turn-on matrix that illustrates the structure of a threshold array of a 4×4 halftone cell 400, which comprises an array or cluster of PELs 402. The halftone cell 400 comprises an array of PELs used to render a dot, and are a basic building block of clustered dot ordered dithered halftones. Each of the PELs 402 in the halftone cell 400 is blackened according to the desired grayscale to be rendered. FIG. 4A illustrates the order in which the PELs 402 are activated as the grayscale command increases. For example, to reproduce white, none of the PELs 402 are activated. To represent the next darker grayscale, first PEL 410 is activated. The next darker shade is rendered by activating second PEL 412 as well. Thus, as the desired grayscale becomes darker and darker, additional PELs are activated. This gives the appearance of a black dot with a diameter chosen to grayscale value to be rendered by the halftone cell 400. As the commanded grayscale approaches black, the appearance of the halftone cell 400 is that of a white dot on a black background. The shape of the halftone cell can be selected to permit tiling across the printed image. Representative shapes include rectangular, diamond, and hexagonal shapes. One way to implement a PEL 402 turn-on sequence to permit grayscale rendering in the halftone cell 400 is to use a threshold array or matrix.

Figure 4B:
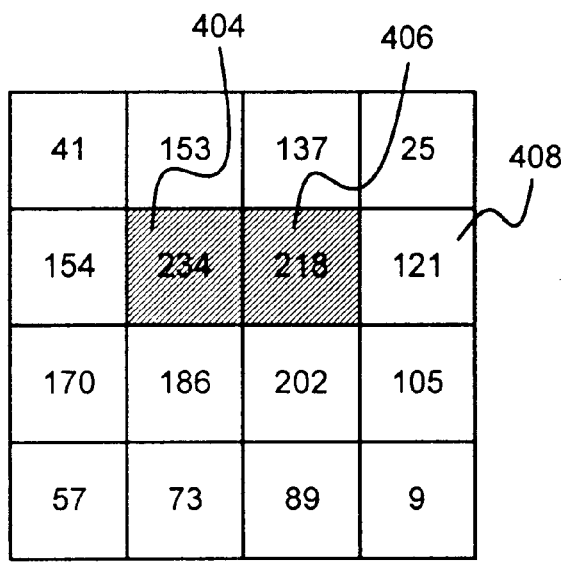
FIG. 4B is a diagram illustrating how dots are rendered using a threshold matrix.

FIG. 4B is a diagram illustrating how dots are rendered using the threshold matrix. Each PEL 402 is activated when the command to that PEL 402 exceeds a specified threshold. As the grayscale level for that PEL increases from pure white to black, individual PELs will be activated, and as the desired image becomes darker and darker, additional PELs are activated, thereby increasing the apparent size of the dot rendered by the halftone cell 400. The selection of thresholds required to activate each PEL in the threshold array determines the shape and size of the halftoning dots. As illustrated in FIG. 4B, when a specific threshold value is exceeded, a first PEL 404 is activated, rendering a small dot with the halftone cell 400. When a larger grayscale level is received, the command exceeds the threshold value for the second PEL 406, and the second PEL 406 is activated, thereby rendering a larger dot within the halftone cell. Since the surrounding PELs have not been activated, the result is one black dot in each halftone cell surrounded by white area from the inactive PELs. When a number of the halftone cells are viewed from a distance they collectively render the desired grayscale. Typically, the threshold values in the halftone cell are made up of equally spaced (incremented) values.

FIG. 4C is a diagram showing how the halftone cells 400 are aggregated or tiled together to cover the entire image to be printed. Halftone cells 400 may be tiled together in an arrangement as shown. This produces a zero degree screen angle.

Figure 4D:
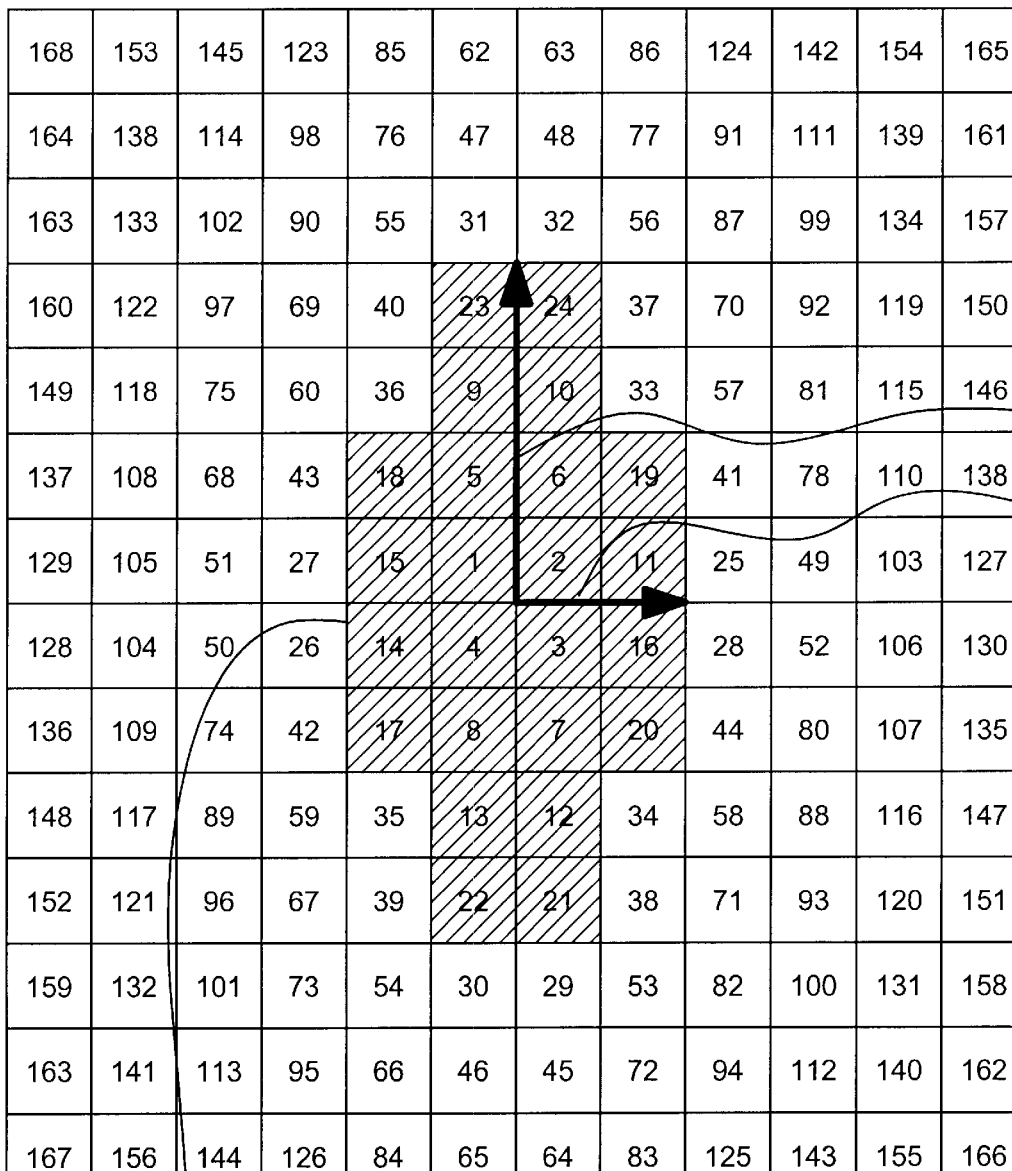
FIG. 4D is a diagram illustrating a halftone cell implementing an elliptical turn-on pattern.

FIG. 4D is a diagram showing a larger halftone cell 414 to illustrate a turn-on pattern for the threshold array modified to account for the specific halftone characteristics of the facsimile presentation device 116. For facsimile machines (which have a resolution of approximately 204×196 or 204×98 DPI), an elliptical turn-on pattern 416 reduces effective distortion of the rendered image. If necessary, the major 418 and minor axes 420 of the elliptical turn-on pattern 416 can be adjusted to render a high quality image.

FIGS. 4E–4J illustrate the turn-on sequence for an arrangement of 3600 PELs in 60×60 matrix defined by thirty-six 10×10 halftone cells. Here, PELs implement an elliptical turn-on pattern spread across multiple non-identical adjacent halftone cells. Because the turn-on pattern is spread across multiple cells, the resulting elliptical shape is non-solid, and spreads across the boundary of the halftone cells. For purposes of illustration, FIGS. 4E–4J identify each cell of the 60×60 matrix with a corresponding number and letter, indicating the row and column, respectively, of the PEL. For example, FIG. 4E shows the turn-on pattern for the first 26 columns (denoted A–Z) of the first 32 rows (denoted 1–32) of the 60×60 matrix, FIG. 4F shows the turn-on pattern for rows 33–60 and the columns A–Z, FIG. 4G shows the turn on pattern for the second 26 columns (AA–AZ) and the first 32 rows, and so on.

As described above, the impact of facsimile presentation device 116 non-linearities such as dot gain, screen type (from the halftone cell 400 implementation), and other factors cause substantial variation between the commanded grayscale print level and the resulting grayscale print level. The receiving facsimile may apply a transfer function to account for these factors by scaling commanded grayscale print levels up or down to a command value required to print the desired grayscales on the printer.

While this technique is effective, it limited in effectiveness because it does not account for variations from one presentation device to another. Suppose for example, that a user desires to transmit a copy of a black and white photograph with multiple grayscale values to a number of relatives via facsimile. Because the different dot gain and other characteristics of each facsimile machine, the printed output from each facsimile machine may bear little resemblance to the desired image. The present invention ameliorates this problem by accounting for facsimile-to-facsimile variations in dot gain, and other factors using a transform having a mapping of input grayscale values to calibrated values. The transform is used to modify the grayscale commands to control the grayscale rendering characteristic of the presentation device.

Figure 5:
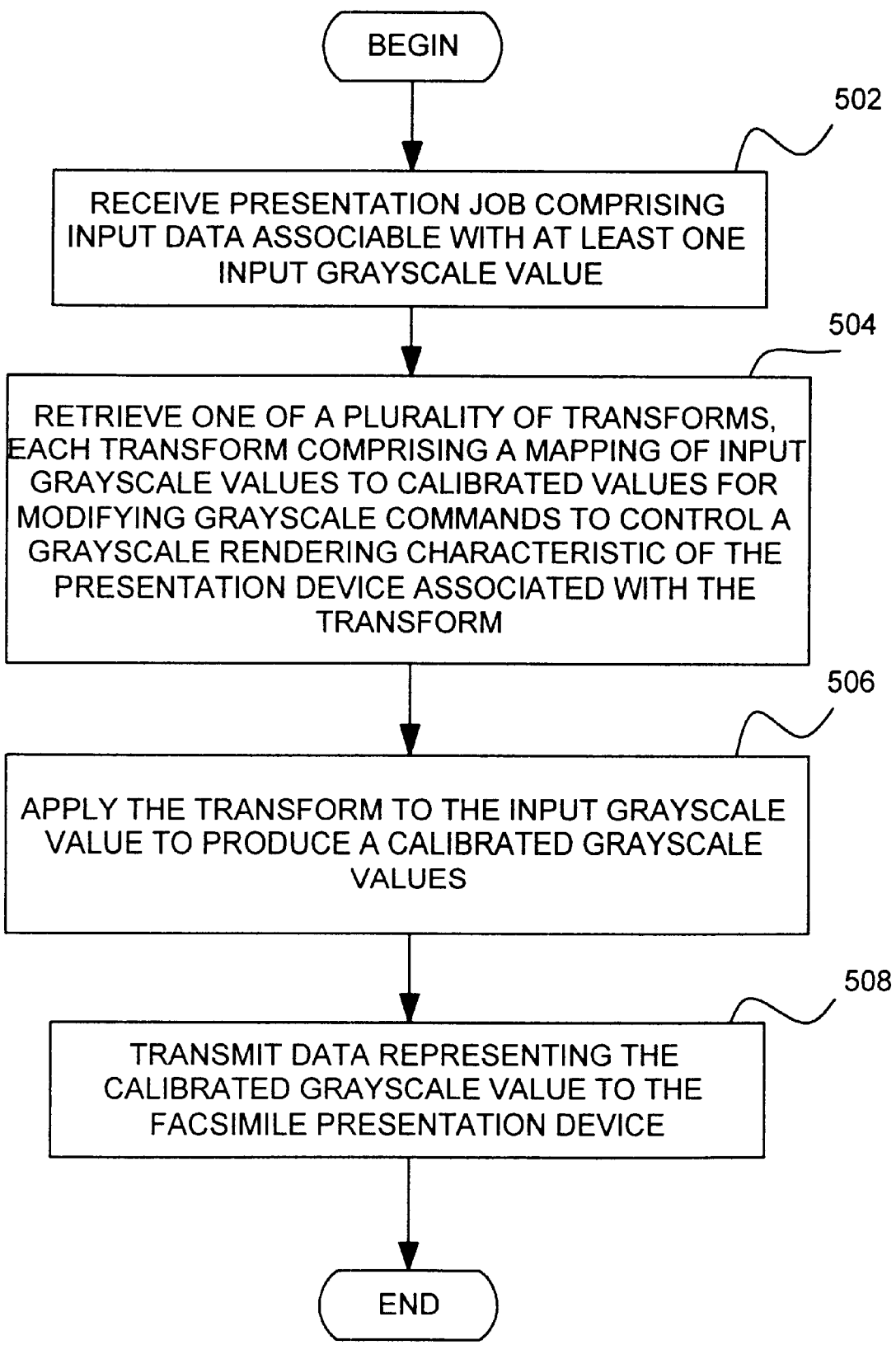
FIG. 5 is a flow chart illustrating exemplary process steps for using a transform to account for facsimile-to-facsimile variations.

FIG. 5 is a flow chart illustrating how the transform described above can be used to account for facsimile-to-facsimile variations. A presentation job having input data associable with at least one input grayscale value is received, as shown in block 502. Then, one of a plurality of transforms is retrieved, as shown in block 504. The transform may be stored in the computer system/network 102, the transmitting facsimile 110, or the facsimile presentation device 116. If the transform is stored in the facsimile presentation device 116, the transform is transmitted to the transmitting facsimile 110 or the computer system/network 102, either as a part of the communications handshaking protocol, an augmented protocol, or as a separate message. The transmission of the transform allows the computer system/network 102 or the transmitting facsimile 110 to operate effectively with any facsimile presentation device 116 while maximizing the quality of the reproduced document. Next, as shown in block 506, the transform is applied to the input grayscale value to produce a calibrated input value. Then, data representing the calibrated grayscale value is transmitted to a facsimile presentation device 116 such as one of the presentation devices 206 or the receiving facsimile 108.

Figure 6:
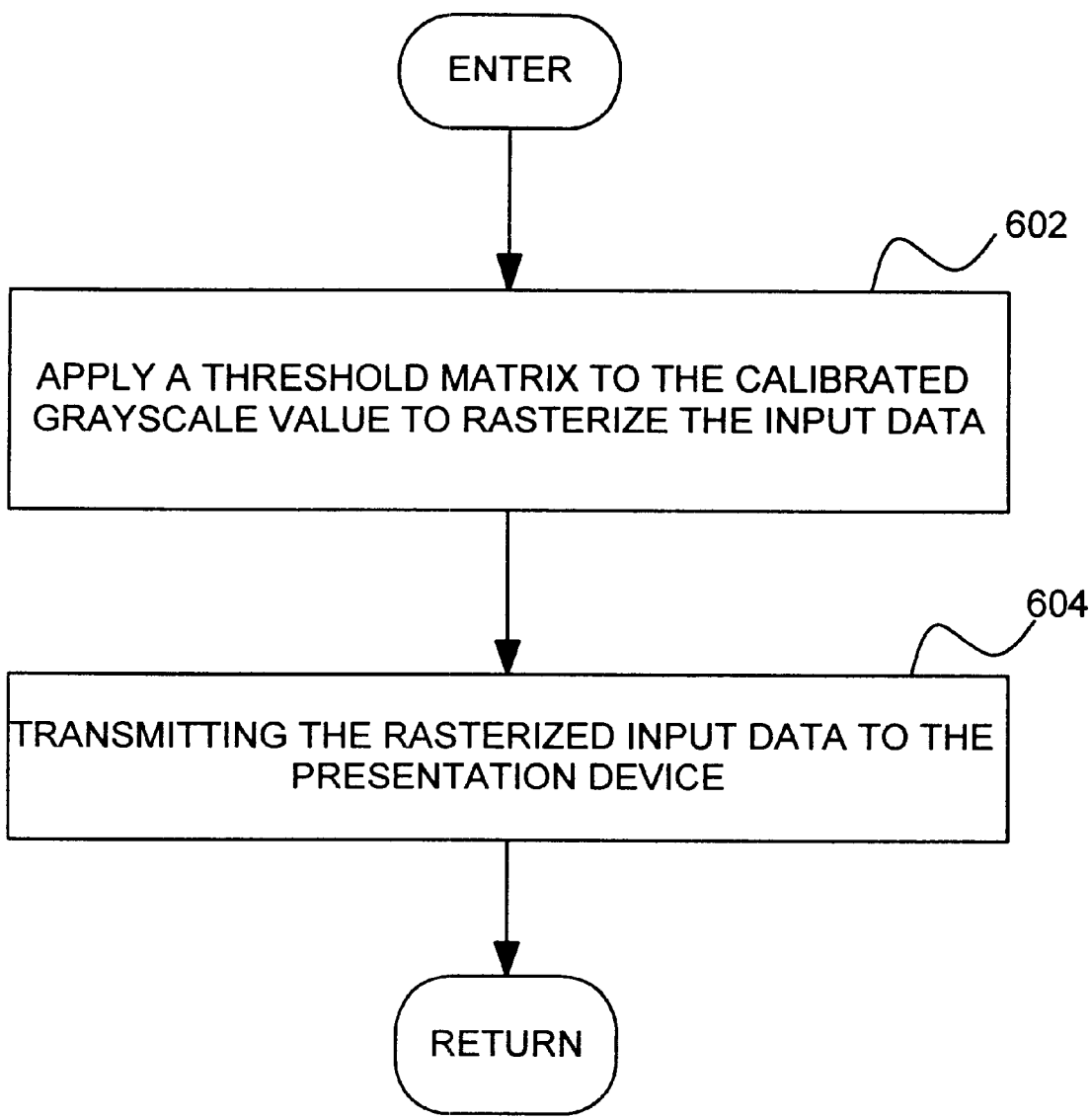
FIG. 6 is a flow chart showing the steps used to perform an embodiment of the invention in which rasterized input data is transmitted to the receiving facsimile.

FIG. 6 is a flow chart showing the steps used to perform an embodiment of the invention in which rasterized input data is transmitted to the facsimile presentation device 116. First, the calibrated grayscale value described above is applied to a threshold matrix 300 to rasterize the input data, as shown in block 602. Then, the rasterized input data is transmitted to the facsimile presentation device 116 such as the receiving facsimile 108.

Figure 7:
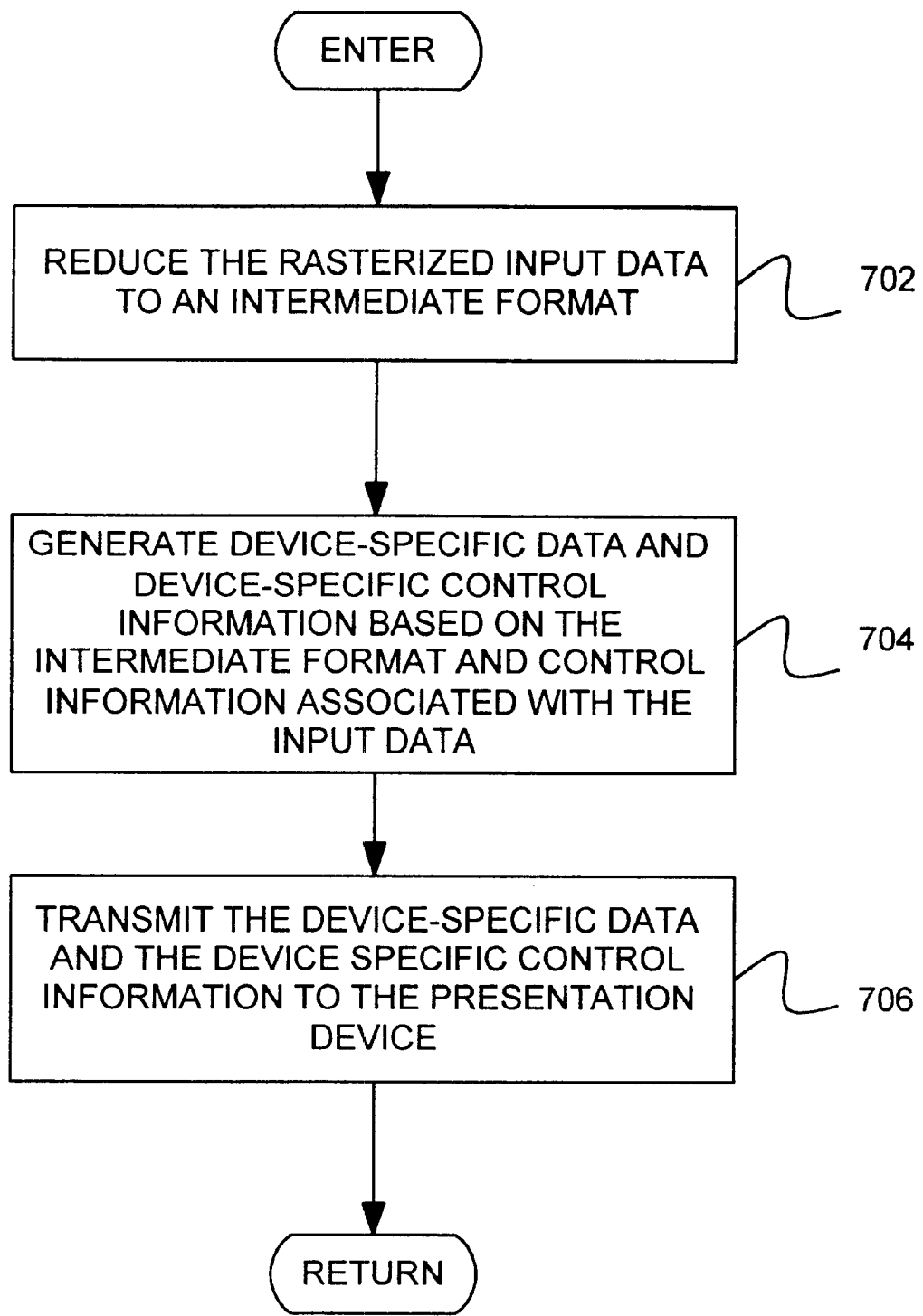
FIG. 7 is a flow chart presenting illustrative process steps used to practice the present invention with the virtual printer architecture.

FIG. 7 is a flow chart illustrating process steps used to practice one embodiment of the present invention with the virtual printer architecture. First, the rasterized input data is reduced to an intermediate format, as shown in block 702. Then, block 704 generates device-specific data and device-specific control information based on the intermediate format and control information associated with the input data. Then, the device specific data and the device-specific control information is transmitted to the facsimile presentation device 116.

Figure 8:
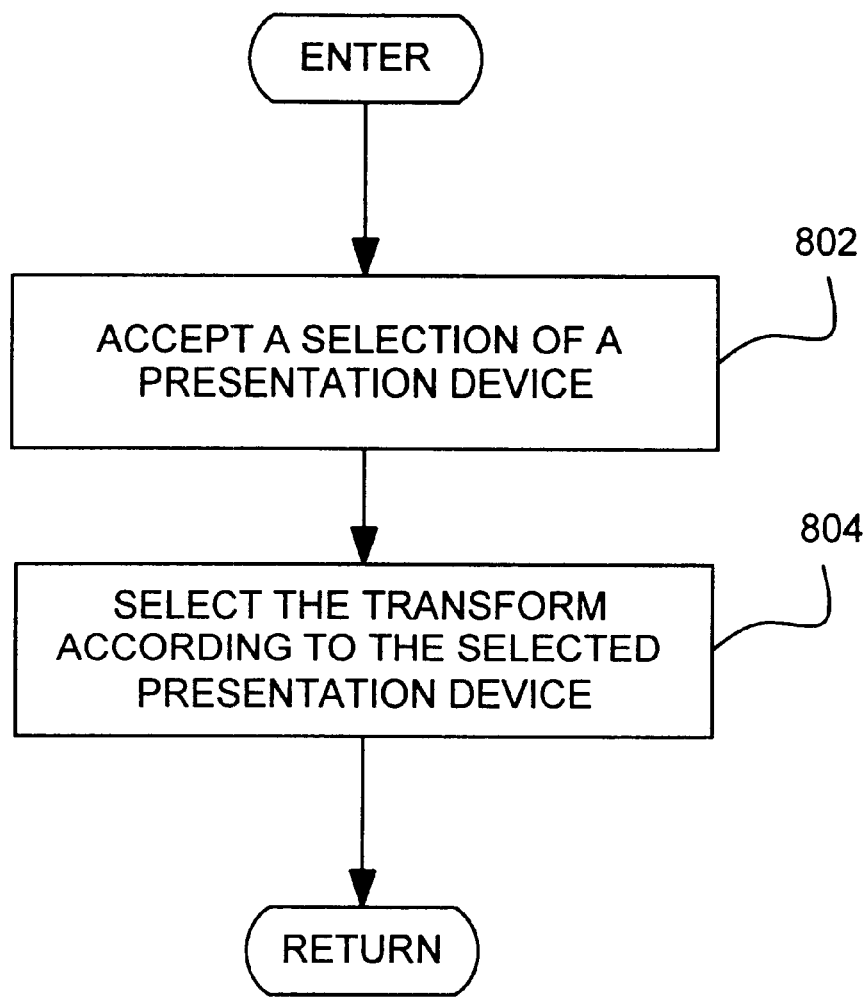
FIG. 8 is a flow chart presenting illustrative process steps used to practice one embodiment of the present invention in which the transform is selected according to the presentation device.

FIG. 8 is a flow chart presenting illustrative process steps used to practice one embodiment of the present invention in which the transform is selected according to the facsimile presentation device 116. The process steps include the step of accepting a selection of a facsimile presentation device 116 in one of the computers 204 or the transmitting facsimile 110, and selecting the transform according to the selected facsimile presentation device 116, as shown in blocks 802 and 804. Alternatively or in conjunction with the foregoing, the transform can be selected according to a user-selected presentation quality.

Figure 9:
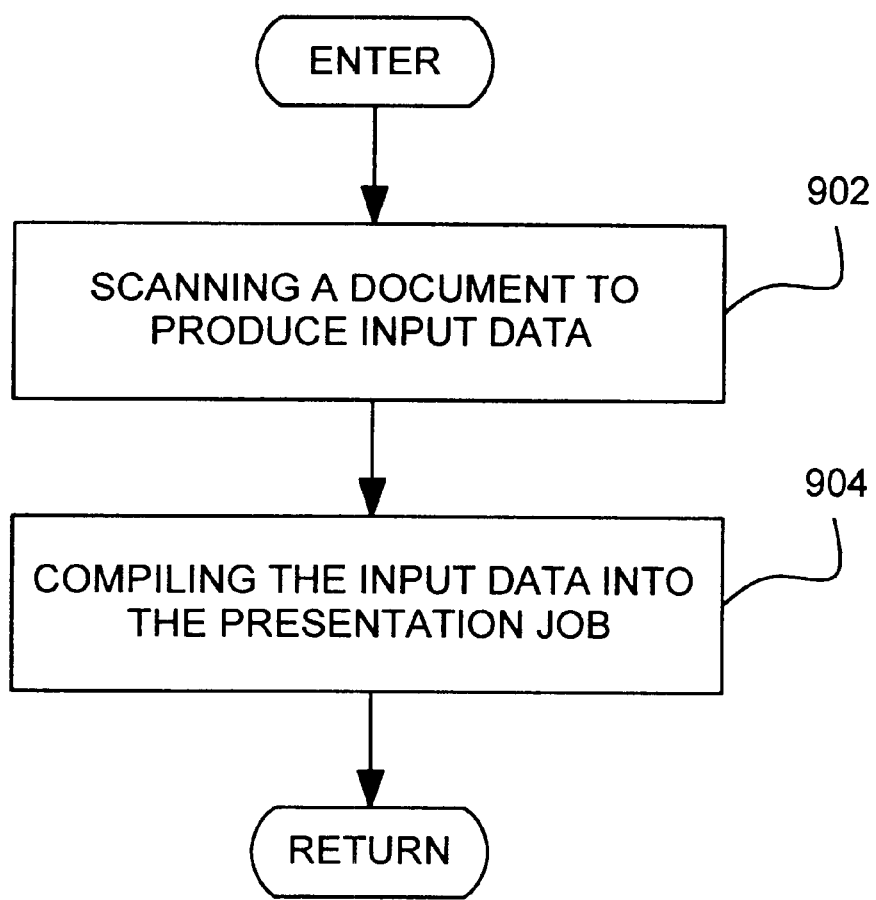
FIG. 9 is a flow chart presenting illustrative process steps used to practice another embodiment of the present invention in which the presentation job is created by scanning media such as a hard copy of a document.

FIG. 9 is a flow chart presenting illustrative process steps used to practice another embodiment of the present invention in which the presentation job is created by scanning media such as a hard copy of a document. Typically, this is accomplished by the transmitting facsimile 110. In this embodiment, the step of receiving the presentation job comprises the step of scanning the media to produce input data, and compiling the input to form the presentation job.

Figure 10:
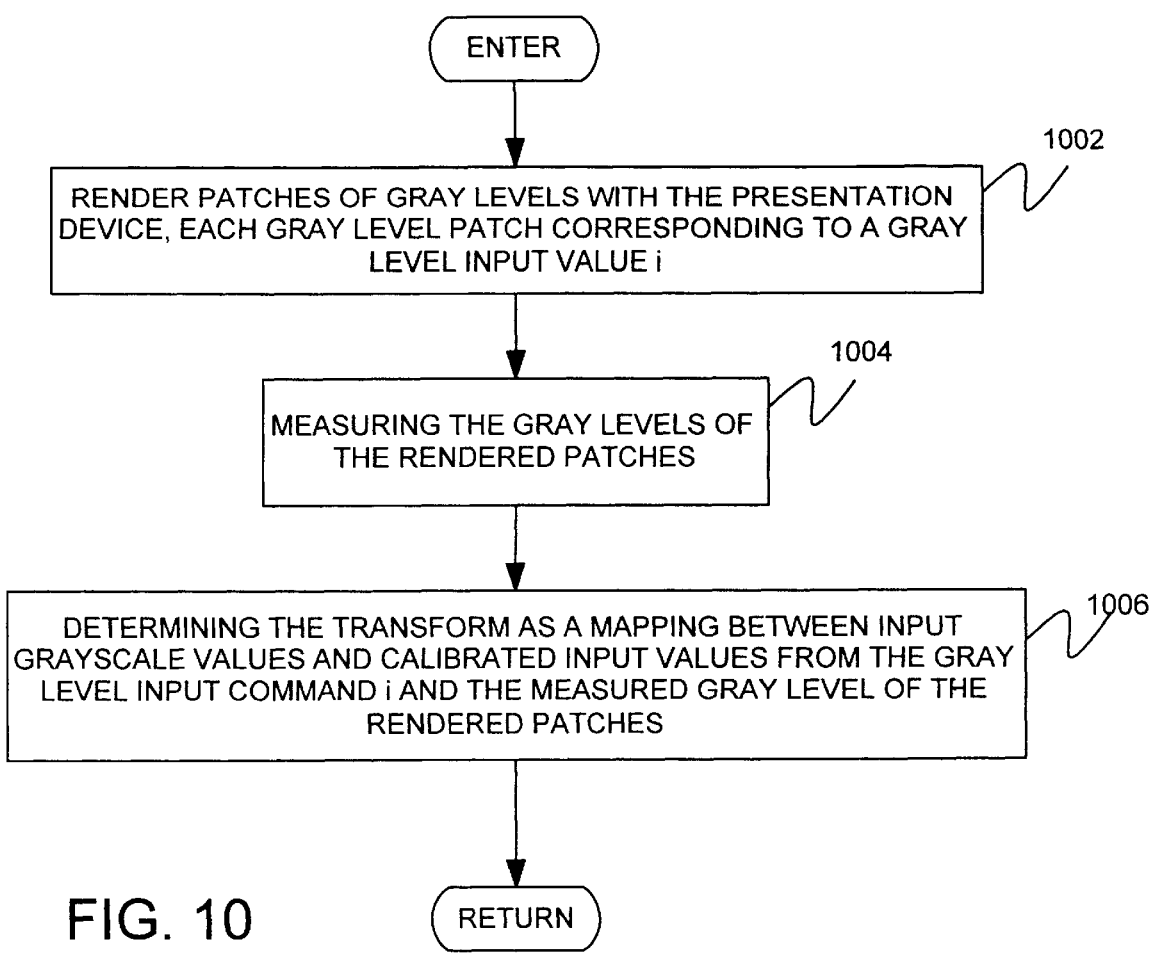
FIG. 10 is a flow chart illustrating the operations performed in characterizing the grayscale printing characteristics of the receiving facsimile or facsimile presentation device according to one embodiment of the present invention.

FIG. 10 is a flow chart illustrating the operations performed in characterizing the grayscale printing characteristics of the receiving facsimile or facsimile presentation device 108. Patches of gray levels are rendered with the facsimile presentation device 116, with each gray level patch corresponding to a gray level input value i. This is shown in block 1002. This is accomplished by providing the facsimile presentation device 116 with gray level input values i=0, 1, 2, . . . N and N is the largest gray level renderable by the facsimile presentation device 116. For clarity, further discussion will assume that the gray level input is i where i=0, 1, 2, . . . 255 and that a halftone screen with a known or given turn on sequence is utilized to render the grayscale patches. This means that 256 patches will be printed from black at i=0 to white at i=255.

Next, as shown in block 1004, the printed gray level of each printed patch is measured. This can be accomplished in several ways. For example, the reflectivity of the printed patch can be measured with a scanner or similar device, or the density of the printed patch can be measured with a densitometer. A single measurement for each patch may be used, or to reduce errors and increase measurement accuracy, several measurements may be taken of each gray level on various pages and various printers of a given type, and the results averaged or otherwise processed to arrive at an improved measurement estimate. Averaging can minimize the effect of measurement and printer variations.

Figure 11:
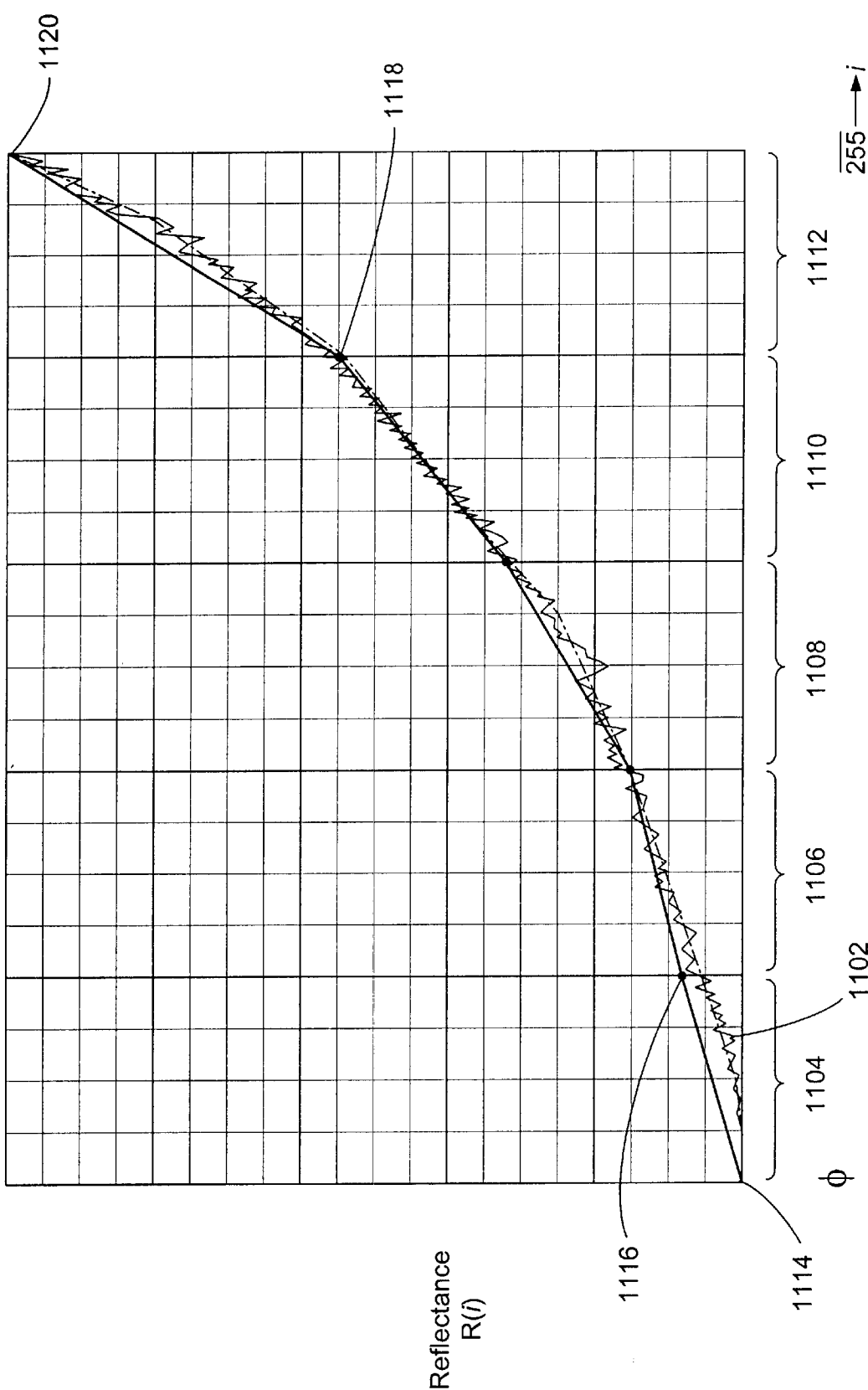
FIG. 11 presents a representative plot of measured reflectivity values for a presentation device according to one embodiment of the present invention.

FIG. 11 presents a representative plot of measured reflectivity values 1102 for one presentation device 116. The data may not increase monotonically with increasing gray level because of measurement errors, printer variations, and the halftone design. The data between these points may be highly zigzagged as shown in FIG. 11. The data may also have a staircase appearance due to the limited number of gray levels of the halftone design, as shown in block 1006.

Referring back to FIG. 10, the measurement data is used to determine a transform as a mapping between input gray scale values and calibrated input values. The mapping is determined from the gray level input value i and the measured gray level of the rendered patches.

Figure 12:
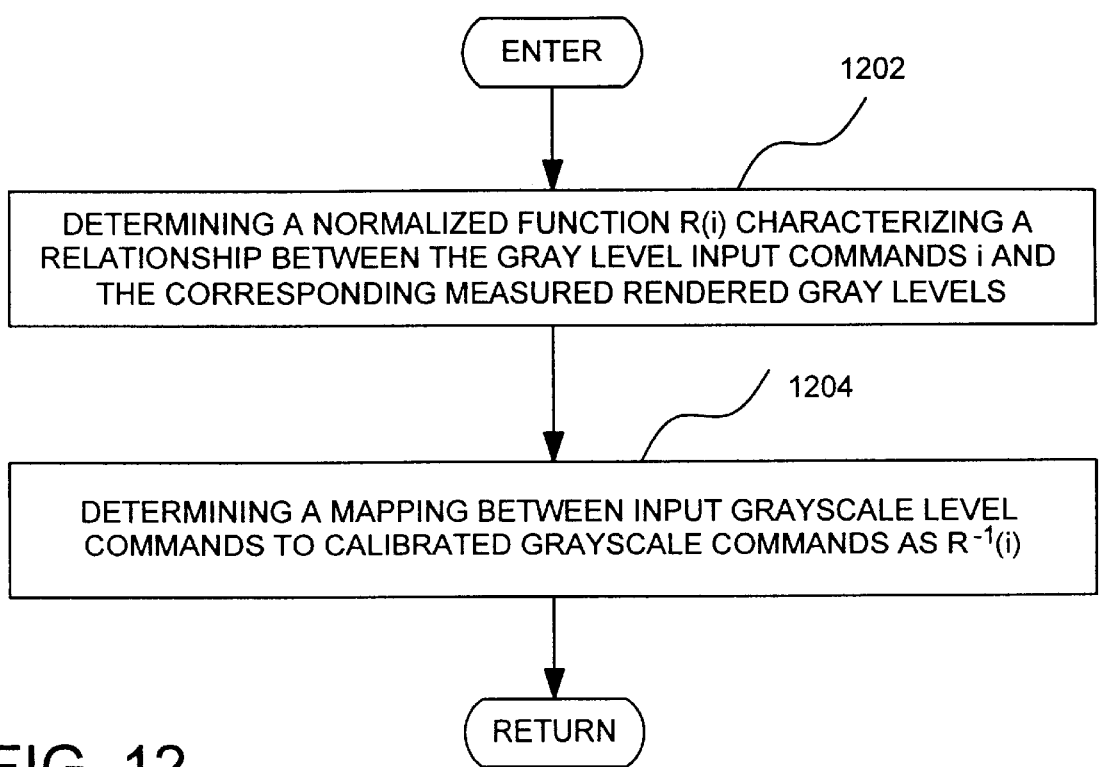
FIG. 12 is a flow chart illustrating exemplary process steps of determining the transform.

FIG. 12 is a flow chart illustrating exemplary process steps of determining the transform described above. A normalized function $R_1(i)$ characterizing a relationship between the gray level value i and the corresponding measured printed gray levels for the facsimile presentation device 116. This is illustrated in block 1202.

The method to define $R_1(i)$ and $R_2(i)$ is graphically depicted in FIG. 11. Here, the input gray level range is divided into a number of intervals 1104, 1106, 1108, 1110, and 1112 in which the measured data $R_1(i)_m$ is represented by straight lines with positive slopes. To assure a positive slope with the zigzagged data previously described, the interval size can be adjusted upwards or downwards as required. The number of intervals is arbitrary, but usually, sections are defined at natural break points such as sharp bends or the endpoints of a staircase. Starting from the origin 1114 and the first segment or interval 1104, the first portion of the curve is curve-fitted to a line passing through the origin 1114 and terminated at the beginning of the second interval 1106. The curve-fitted line joins at the end point of the first interval 1116 and extends to the start of the next interval. This process is continued for all intervals. For the last interval 1112, the curve fitted line joins at the end-point of the preceding interval 1118 and the last point 1120.

The foregoing steps generate a grayscale profile curve in piecewise linear functions. Assuming N segments are used in the piecewise representation, for the $m^{th}$ piecewise linear section or interval:

$$R_{1c}(i)=R_{1c}(n)+(i-n)P_{1m}$$

where $$n = \sum_{j=1}^{m-1} \Delta j \quad \text{for } m > 1$$

and n=φ for m=1
where $R_{1c}(i)$ is the curve fitted reflectance value at index i; n is the value at the beginning of an interval; $P_{1m}$, is the derived slope for the interval segment, and each section has interval size $\Delta_j$.

A normalized function $R_1(i)$ is computed from the values of the curve fitted function $R_{1c}(i)$ as:

$$R_1(i)=(R_{1c}(i)-R_{1c}(0))/R_{1c}(255)-R_{1c}(0))$$

For 256 equally-spaced grayscale inputs i=0, 1, 2, . . . 255, the above equation provides 256 printer outputs $R_1(i)$, i=0, 1, 2, . . . 255. In such a case, 256 patches may be printed, measured, and curve fitted as described above. The curve fitted function is then normalized to range from 0 to 1. Other curve fitting schemes can also be used. For example, the measured data can be fit to a power curve of the form $y=ax^b$ or by using splines. In some cases, the selection of a non-linear curve-fitting algorithm relieves the need to separate the input gray range into intervals. However, segmenting the input gray range into intervals is still an effective technique in cases where a precise match at a particular gray level is desired, since a near perfect match to measured data may be obtained at these nodes like point 1118. After R(i) has been determined, the mapping between input grayscale level commands and calibrated grayscale commands is determined as $R^{-1}(i)$, as shown in block 1204.

Figure 13:
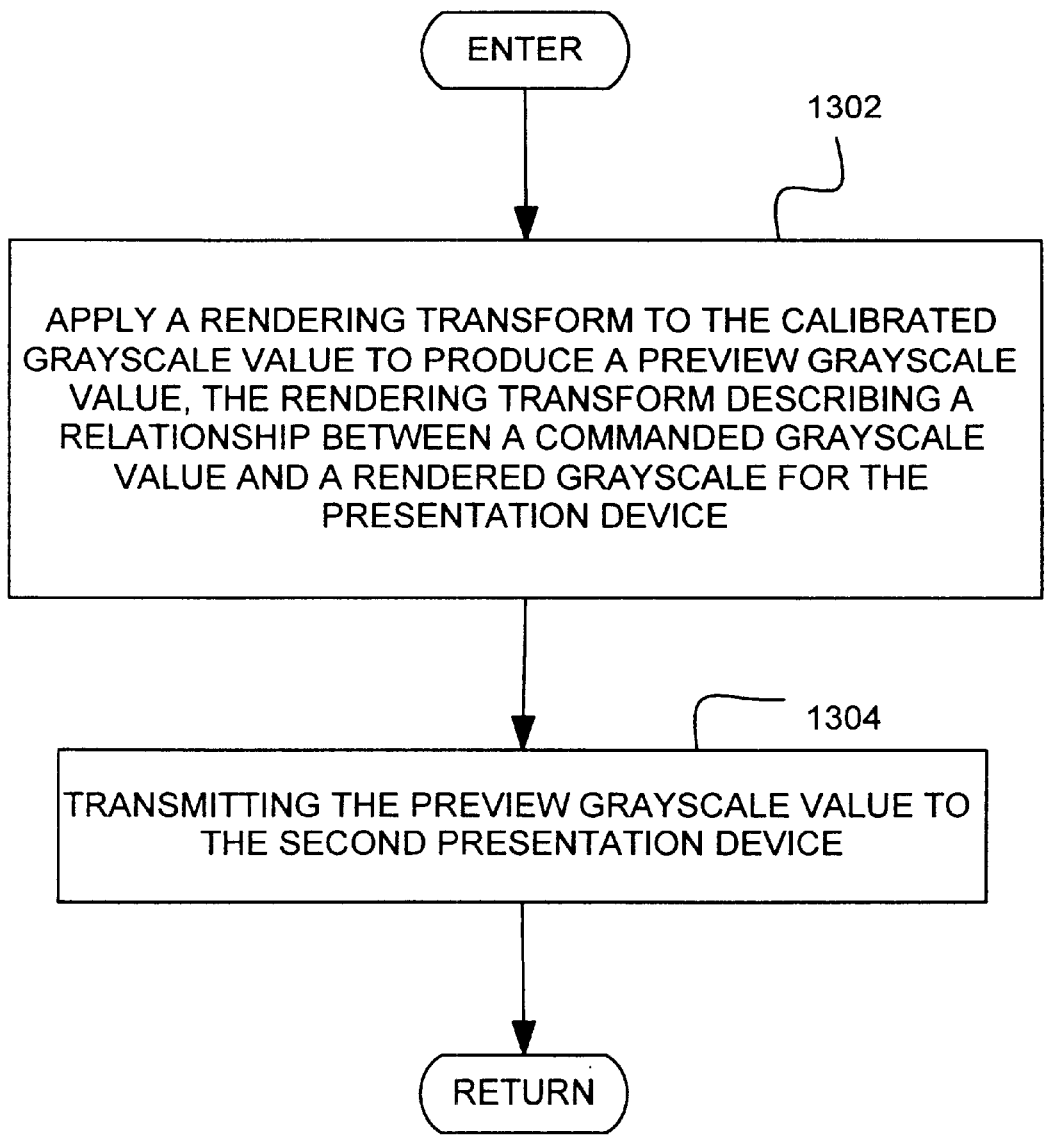
FIG. 13 is a flowchart depicting another embodiment of the present invention in which a rendering transform is used to present a preview to the user indicating how the facsimile transmission will appear when rendered by the receiving facsimile.

FIG. 13 is a flowchart depicting another embodiment of the present invention in which a rendering transform is used to present a preview to the user indicating how the facsimile transmission will appear when rendered by the facsimile presentation device 116. This is accomplished by rendering a preview of the facsimile transmission in a second presentation device. The second presentation device can be a printer, a facsimile machine, or a computer display convenient to the user. Each of these second presentation devices has its own grayscale rendering characteristics that must be accounted for when previewing the facsimile transmission.

The characteristics of the second presentation device are accounted for by a rendering transform. The rendering transform describes a relationship between the grayscale value in the image on the second presentation device and a rendered grayscale value for the second presentation device. The rendering transform is applied to the calibrated grayscale value to produce a preview grayscale value, as shown in block 1302. Then the preview grayscale value is transmitted to the second presentation device, as shown in block 1304.

Figure 14:
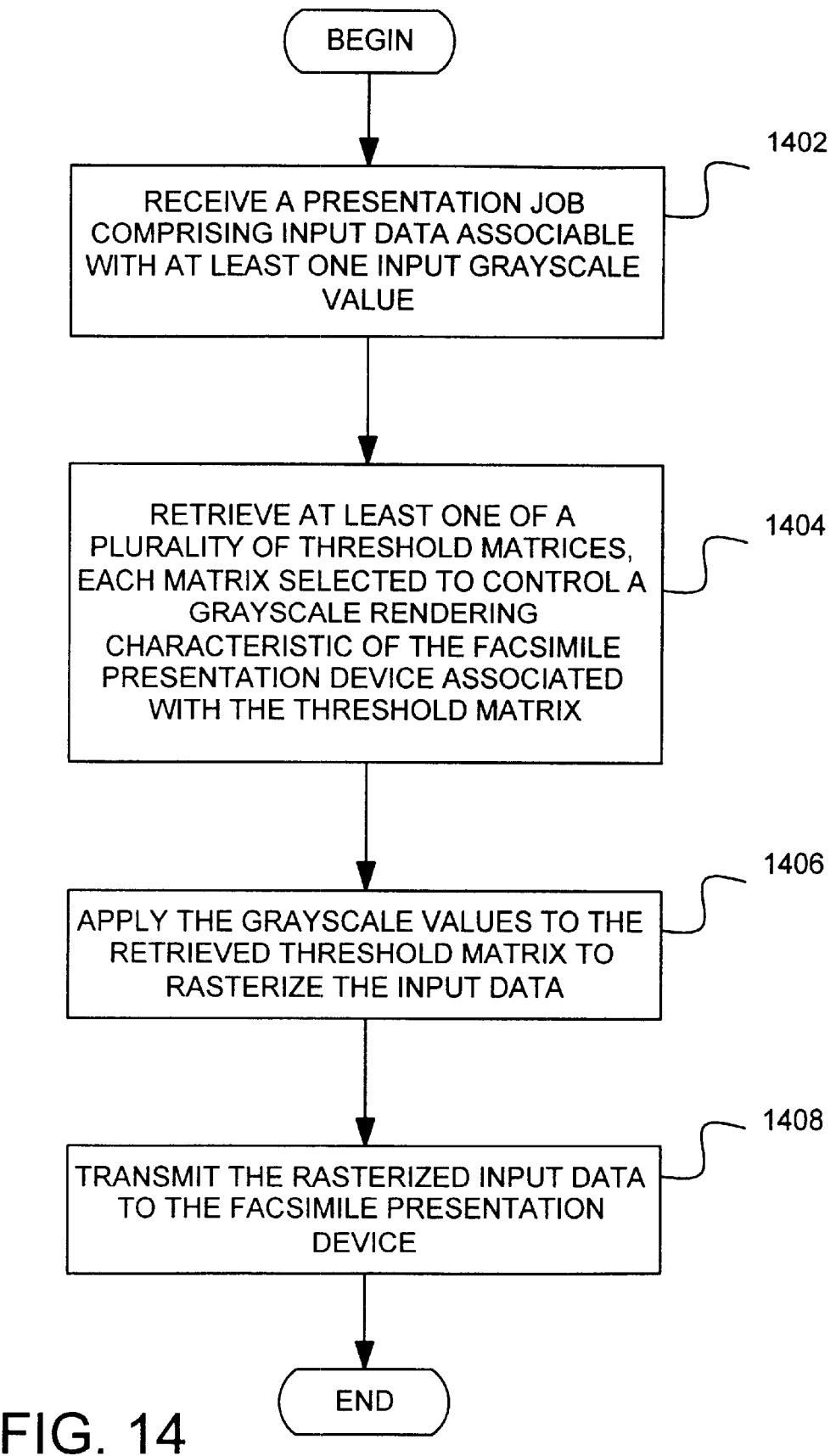
FIG. 14 is a flow chart illustrating exemplary process steps for an embodiment in which the grayscale rendering of the facsimile presentation device is controlled via changes in the threshold matrix.

In one embodiment of the present invention, the grayscale rendering of the facsimile presentation device is controlled via changes in the threshold matrix 300. FIG. 14 presents exemplary process steps for this embodiment. First, a presentation job comprising input data associable with at least one input grayscale value is received 1402. Then, at least one of a plurality of threshold matrices is retrieved 1404. The retrieved threshold matrix is selected to control the grayscale rendering of a facsimile presentation device 116 such as one of the presentation devices 206 or the receiving facsimile 108. Next, the grayscale values are applied to the retrieved threshold matrix to rasterize the input data, as shown in block 1406. Then, the rasterized input data is transmitted 1408 to facsimile presentation device 116.

It is noted that rather than controlling the grayscale rendering of the facsimile presentation device 116 by selecting threshold matrices, the foregoing can be implemented by combining a threshold matrix compensating for the grayscale rendering characteristics of the facsimile presentation device 116 with a nominal threshold matrix (such as would be used if the grayscale rendering characteristic were linear).

Figure 15:
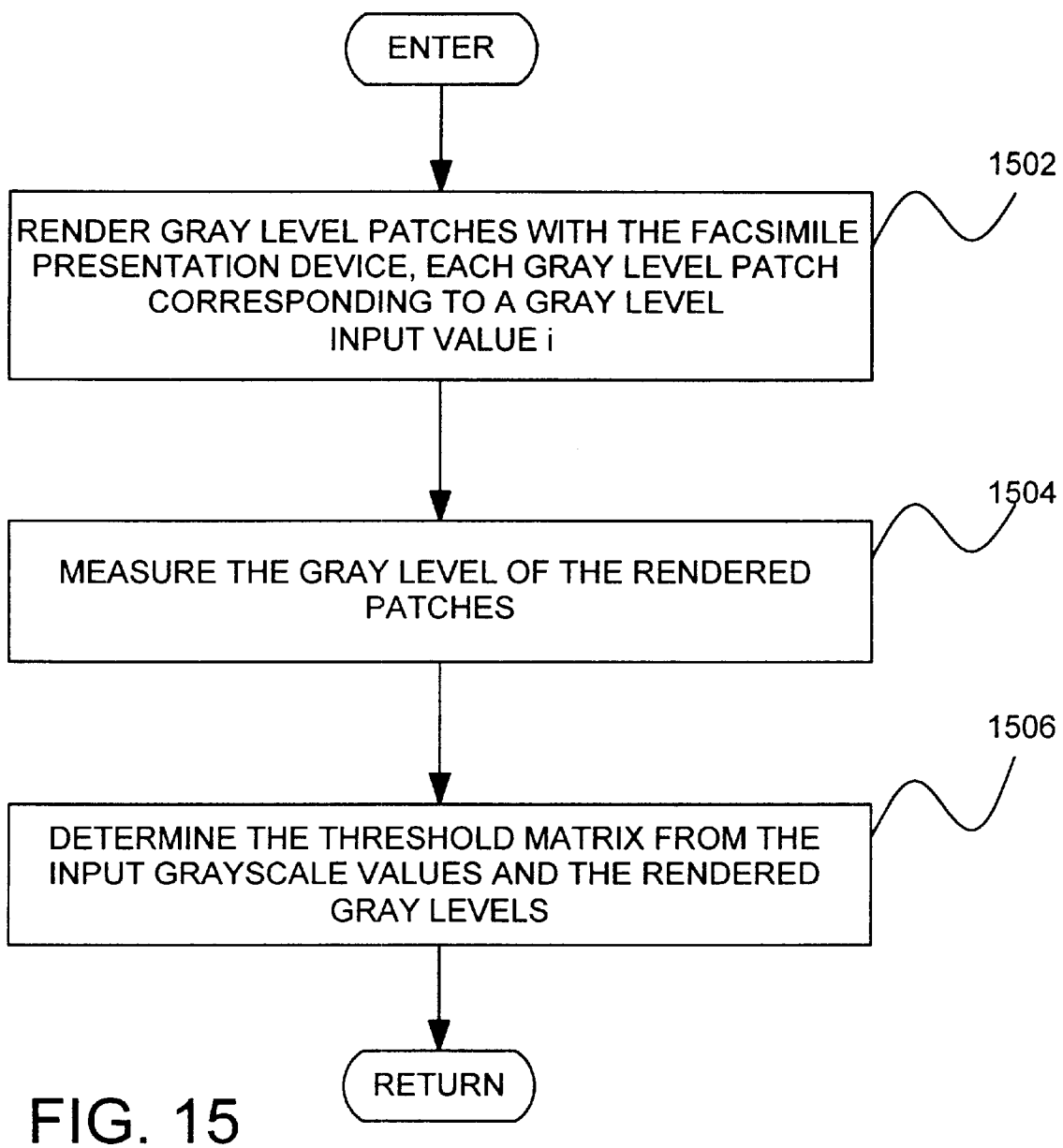
FIG. 15 is a flow chart illustrating exemplary process steps used to generate the threshold matrix.

FIG. 15 is a flow chart illustrating exemplary process steps used to generate the threshold matrix. First, gray level patches are rendered with the facsimile presentation device 116e, as shown in block 1502. Each gray level patch corresponds to a gray level input command i. Then, the gray level of the rendered patches is measured 1504 using the same techniques described above. This is shown in block 1504. Then, a threshold matrix 300 is determined from the input grayscale values and the rendered grayscale values, as shown in block 1506.

Figure 16:
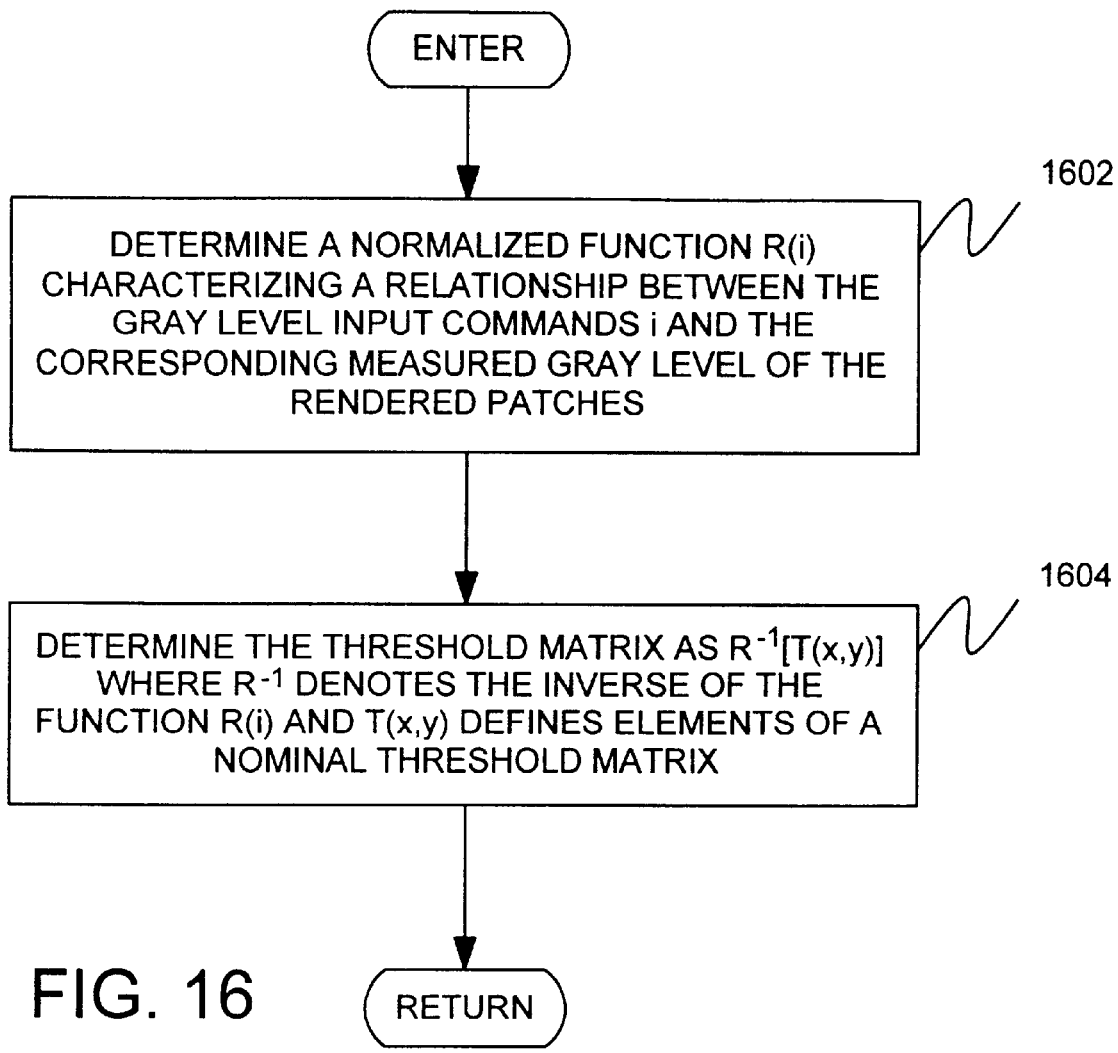
FIG. 16 is a flow chart showing exemplary process steps used to determine the threshold matrix from the input grayscale values and the rendered grayscale values.

FIG. 16 is a flow chart showing exemplary process steps used to determine the threshold matrix from the input grayscale values and the rendered grayscale values, as shown in block 1506. First, a normalized function R(i) is determined. R(i) characterizes a relationship between the gray level input commands i and the corresponding measured gray level of the rendered patches, as shown in block 1602. Then, the threshold matrix is determined 1604 as $R^{-1}[T(x,y)]$ where $R^{-1}$ denotes the inverse of the function R(i) and T(x,y) defines elements of a nominal threshold matrix. The nominal threshold matrix can represent a threshold matrix for a presentation device 116 with an ideal dot gain characteristic.

In some circumstances, it is desirable to control the printing characteristics of the facsimile presentation device 116 to emulate the grayscale printing characteristics of another presentation device such as a one of the printers 208–214.

Figure 17:
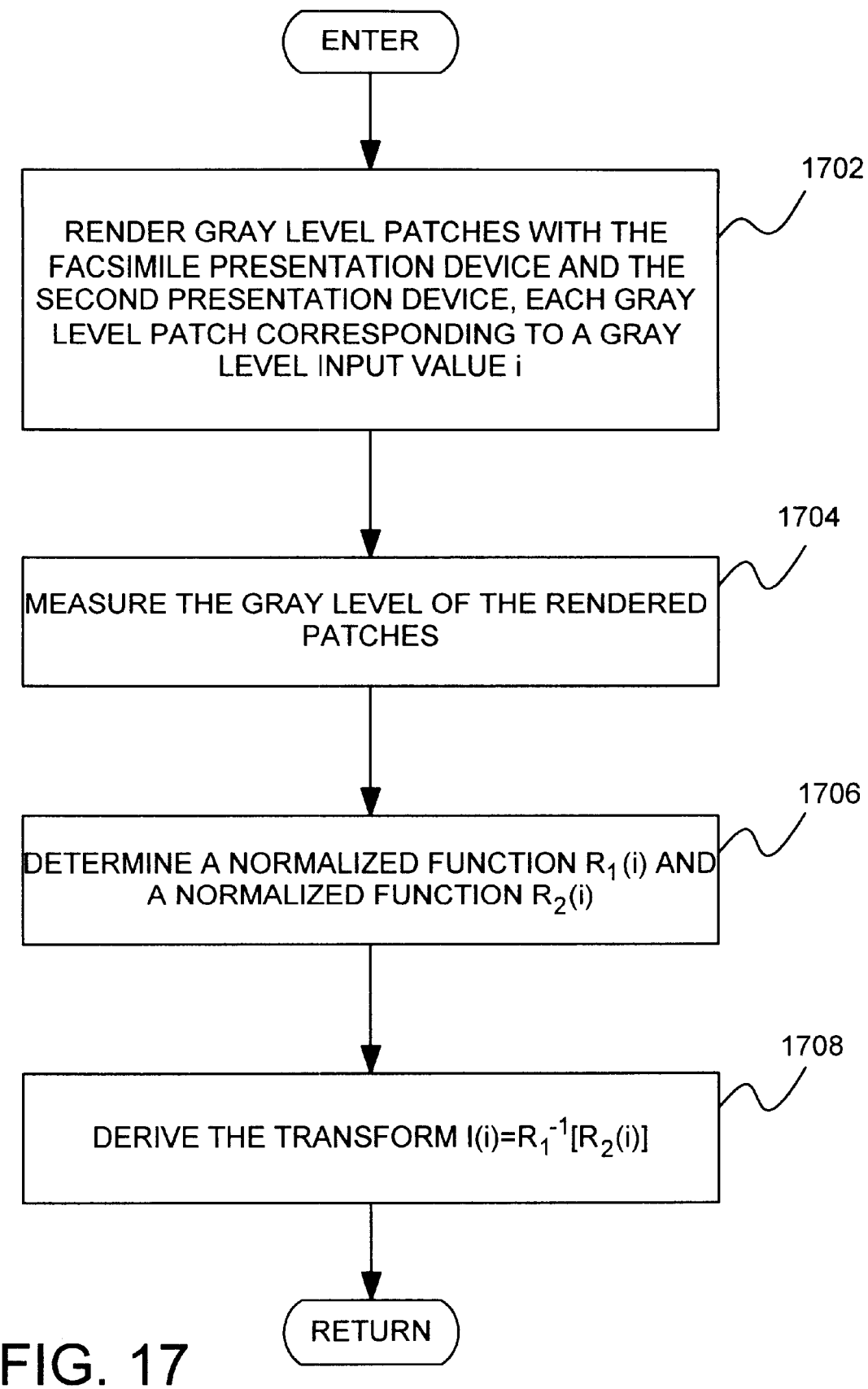
FIG. 17 is a flow chart illustrating the process steps used to drive the facsimile presentation device to emulate the grayscale printing characteristics of a second presentation device.

FIG. 17 is a flow chart illustrating the process steps used to drive the facsimile presentation device 116 to emulate the grayscale printing characteristics of a second presentation device. First, patches of gray levels are printed with the facsimile presentation device 116 and the second presentation device (such as one of the printers 208–214 or the display coupled to one of the computers 204. This is depicted in block 1702. This is accomplished by providing the facsimile presentation device 116 and second presentation device with gray level input values i=0, 1, 2, . . . N and N is the largest gray level renderable by either device. For clarity, further discussion will assume that the gray level input is i where i=0, 1, 2, . . . 255 and that a halftone screen with a known or given turn on sequence is utilized to render the grayscale patches. This means that 256 patches will be printed from black at i=0 to white at i=255.

Next, as shown in block 1704, the printed gray level of each printed patch is measured. This can be accomplished using the methods described above. Next the measurement data is used to define a normalized function $R_1(i)$ such that $R_1(i)$ characterizes the normalized relationship between the gray level commands i and the corresponding measured printed gray levels for the facsimile presentation device 108. Similarly, measurement data from the second presentation device 208–214 is used to define a normalized function $R_2(i)$ such that $R_2(i)$ characterizes the normalized relationship between the gray level commands i and the corresponding measured gray levels for the second presentation device 208–214. This is illustrated in blocks 1704 and 1706, respectively. The method to define $R_1(i)$ is graphically depicted in FIG. 11 as described earlier in this disclosure.

The foregoing operations are also used to determine the function $R_2(i)$ such that $R_2(i)$ characterizes the relationship between the gray level commands and the corresponding measured printed patch gray levels for the second printer 114. $R_2(i)$ may also represent an ideal printer, in which case, $R_2(i)$ is already known. For example, $R_2(i)$ may be defined as $R_2(i)=(i/255)$. Although not necessary, if piecewise linear curve fitting techniques are used, it is advisable to select the same increments for this process as were selected to determine $R_1(i)$. It is worthy to note that using the foregoing steps, the halftone threshold matrix and line screen frequency of the target (second) printer 114 need not match those of the base (first) printer 112.

Next, as described in block 1708 of FIG. 17, a transform I(i) is defined such that:

$$I(i)=R_1^{-1}R_2(i)$$

where $R_1^{-1}(i)$ is the inverse function of $R_1(i)$. I(i) may be a non-integer. For this case, the discrete values for I(i) are rounded to the nearest integer.

In one embodiment, the transform I(i) is used directly to translate input grayscale values cause the facsimile presentation device 108 to emulate the grayscale printing characteristics of the second presentation device. In another embodiment, I(i) is used to modify a threshold matrix. This is accomplished by replacing each value of the threshold matrix T(x,y) with I(T(x,y)). Because the information required to calibrate the facsimile presentation device 116 is inherent in the threshold matrix after the described modification, there is no need to incur the expense or complexity of storing and maintaining transformation matrices as well as the halftone cell threshold matrix. The new threshold matrix can then be used whenever the facsimile presentation device 116 is asked to simulate the second presentation device.

Conclusion

This concludes the description of the preferred embodiments of the present invention. In summary, the present invention describes a method, and apparatus for transmitting data to a presentation device.

According to one embodiment of the invention, the method comprises the steps of receiving a presentation job comprising input data associable with at least one input grayscale value, retrieving at least one of a plurality of threshold matrices, each threshold matrix selected to control a grayscale rendering characteristic of the facsimile presentation device associated with the threshold matrix, applying the grayscale values to the retrieved threshold matrix to rasterize the input data, and transmitting the rasterized input data to the facsimile presentation device. In one embodiment of the present invention, the step of transmitting the rasterized input data to the presentation device comprises the steps of reducing the rasterized input data to an intermediate format being one of a number of widely supported formats, generating device-specific data and device-specific control information for the presentation device based on the intermediate format and control information associated with the input data, and transmitting the device-specific data and the device-specific control information to the presentation device. This invention can be practiced in several embodiments, and permits the user to select the threshold matrix according to the presentation device and/or a selected presentation quality.

According to another embodiment of the invention, the apparatus comprises a means for receiving a presentation job having input data associable with at least one input grayscale value, means for retrieving at least one of a plurality of threshold matrices, each threshold matrix selected to control a grayscale rendering characteristic of the facsimile presentation device associated with the threshold matrix, means for applying the grayscale values to the retrieved threshold matrix to rasterize the input data, and means for transmitting the rasterized input data to the facsimile presentation device. In one embodiment, the apparatus comprises a facsimile machine, and the means for receiving a presentation job comprises a scanner. In another embodiment, the apparatus is comprised of a computer executing software instructions to translate a document, image, or other computer file into rasterized input data for transmission to a presentation device. The foregoing description of the preferred embodiment of the invention has been presented for the purposes of illustration and description. It is not intended to be exhaustive or to limit the invention to the precise form disclosed. Many modifications and variations are possible in light of the above teaching. For example the present invention may be described as a memory structure for storing the transform data used in practicing the above-described invention. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of transmitting data to a facsimile presentation device, comprising the steps of:

receiving a presentation job comprising input data associable with at least one input grayscale value;

retrieving at least one of a plurality of threshold matrices, each threshold matrix selected to control a grayscale rendering characteristic of the facsimile presentation device associated with the threshold matrix;

applying the grayscale values to the retrieved threshold matrix to rasterize the input data; and transmitting the rasterized input data to the facsimile presentation device;

wherein the step of transmitting the data representing the calibrated grayscale values to the facsimile presentation device comprises the steps of:

reducing the rasterized input data to an intermediate format, the intermediate format being one of a number of widely supported formats;

generating device-specific data and device-specific control information for the facsimile presentation device based upon the intermediate format and control information associated with the input data; and transmitting the device-specific data and the device-specific control information to the facsimile presentation device.

2. The method of claim 1, wherein the retrieved threshold matrix implements a substantially elliptical turn-on pattern.

3. The method of claim 1, further comprising the steps of:

accepting a selection of the facsimile presentation device; and selecting the threshold matrix according to the selected facsimile presentation device.

4. The method of claim 1, further comprising the steps of:

accepting a selection of a-presentation quality; and selecting the threshold matrix according to the selected presentation quality.

5. The method of claim 1, wherein the step of receiving the presentation job comprising input data associable with at least one input grayscale value comprises the steps of:

scanning a media to produce input data; and compiling the input data into the presentation job.

6. The method of claim 1, wherein the threshold matrix is retrieved remotely from the facsimile presentation device.

7. The method of claim 1, wherein at least one of the threshold matrices is generated by performing the steps of:

rendering gray level patches with the facsimile presentation device, each gray level patch corresponding to a gray level input command i;

measuring the gray level of the rendered patches; and determining the threshold matrix from the input grayscale values and the rendered gray levels.

8. The method of claim 7, wherein the step of determining the threshold matrix comprises steps of:

determining a normalized function R(i) characterizing a relationship between the gray level input commands i and the corresponding measured gray level of the rendered patches; and determining the threshold matrix as $R^{-1}[T(x,y)]$ where $R^{-1}$ denotes the inverse of the function R(i) and T(x,y) defines elements of a nominal threshold matrix.

9. The method of claim 1, wherein the image rendered on the facsimile presentation device emulates a grayscale rendering characteristic of a second presentation device, and at least one of the threshold matrices is generated by performing steps comprising the steps of:

rendering gray level patches with the facsimile presentation device, each gray level patch corresponding to a gray level input value i;

rendering gray level patches with the second presentation device, each gray level patch corresponding to a gray level input value i;

measuring the gray level of the rendered patches;

determining a normalized function $R_1(i)$ and a normalized function $R_2(i)$ such that $R_1(i)$ characterizes a relationship between a gray level input value i and a corresponding gray level rendered by the facsimile presentation device and $R_2(i)$ characterizes a relationship between a gray level input value i and a corresponding measured gray level rendered by the second presentation device; and determining the threshold matrix as $R_1^{-1}R_2(i)[T(x,y)]$ wherein T(x,y) defines elements of a facsimile presentation device threshold matrix.

10. An apparatus for transmitting data to a facsimile presentation device, comprising:

means for receiving a presentation job comprising input data associable with at least one input grayscale value;

means for retrieving at least one of a plurality of threshold matrices, each threshold matrix selected to control a grayscale rendering characteristic of the facsimile presentation device associated with the threshold matrix;

means for applying the grayscale values to the retrieved threshold matrix to rasterize the input data; and means for transmitting the rasterized input data to the facsimile presentation device;

wherein the means for transmitting the data representing the calibrated grayscale values to the facsimile presentation device comprises:

means for reducing the rasterized input data to an intermediate format, the intermediate format being one of a number of widely supported formats;

means for generating device-specific data and device-specific control information for the facsimile presentation device based upon the intermediate format and control information associated with the input data; and means for transmitting the device-specific data and the device-specific control information to the facsimile presentation device.

11. The apparatus of claim 10, wherein the retrieved threshold matrix implements a substantially elliptical turn-on pattern.

12. The apparatus of claim 10, further comprising:

means for accepting a selection of the facsimile presentation device; and means for selecting the threshold matrix according to the selected facsimile presentation device.

13. The apparatus of claim 10, further comprising:

means for accepting a selection of a presentation quality; and means for selecting the threshold matrix according to the selected presentation quality.

14. The apparatus of claim 1, wherein the means for receiving the presentation job comprising input data associable with at least one input grayscale value comprises:

means for scanning a media to produce input data; and means for compiling the input data into the presentation job.

15. The apparatus of claim 10, wherein the threshold matrix is retrieved remotely from the facsimile presentation device.

16. The apparatus of claim 10, wherein at least one of the threshold matrices is generated by an apparatus comprising:

means for rendering gray level patches with the facsimile presentation device, each gray level patch corresponding to a gray level input value i;

means for measuring the gray level of the rendered patches; and means for determining the threshold matrix from the input grayscale values and the rendered gray levels.

17. The apparatus of claim 16, wherein the means for determining the threshold matrix comprises:

means for determining a normalized function R(i) characterizing a relationship between the gray level input commands i and the corresponding measured gray level of the rendered patches; and means for determining the threshold matrix as $R^{-1}[T(x,y)]$ where $R^{-1}$ denotes the inverse of the function R(i) and T(x,y) defines elements of a nominal threshold matrix.

18. The apparatus of claim 10, wherein the image rendered on the facsimile presentation device emulates a grayscale rendering characteristic of a second presentation device, and the at least one of the threshold matrices is generated by an apparatus comprising:

means for rendering gray level patches with the facsimile presentation device, each gray level patch corresponding to a gray level input value i;

means for rendering gray level patches with the second presentation device, each gray level patch corresponding to a gray level input value i;

means for measuring the gray level of the rendered patches;

means for determining a normalized function $R_1(i)$ and a normalized function $R_2(i)$ such that $R_1(i)$ characterizes a relationship between a gray level input value i and a corresponding gray level rendered by the facsimile presentation device and $R_2(i)$ characterizes a relationship between a gray level input value i and a corresponding measured gray level rendered by the second presentation device; and means for determining the threshold matrix as $R_1^{-1}R_2(i)$ [T(x,y)] wherein T(x,y) defines elements of a facsimile presentation device threshold matrix.

19. A program storage device readable by a computer, tangibly embodying at least one program of instructions executable by the computer to perform method steps of transmitting data to a facsimile presentation device, the method comprising the steps of:

receiving a presentation job comprising input data associable with at least one input grayscale value;

retrieving at least one of a plurality of threshold matrices, each threshold matrix selected to control a grayscale rendering characteristic of the facsimile presentation device associated with the threshold matrix;

applying the grayscale values to a the retrieved threshold matrix to rasterize the input data; and transmitting the rasterized input data to the facsimile presentation device;

wherein the method step of transmitting the data representing the calibrated grayscale values to the facsimile presentation device comprises the method steps of:

reducing the rasterized input data to an intermediate format, the intermediate format being one of a number of widely supported formats;

generating device-specific data and device-specific control information for the facsimile presentation device based upon the intermediate format and control information associated with the input data; and transmitting the device-specific data and the device-specific control information to the facsimile presentation device.

20. The program storage device of claim 19, wherein the retrieved threshold matrix implements a substantially elliptical turn-on pattern.

21. The program storage device of claim 19, wherein the method steps further comprise the steps of:

accepting a selection of the facsimile presentation device; and selecting the threshold matrix according to the selected facsimile presentation device.

22. The program storage device of claim 19, herein the method steps further comprise the steps of:

accepting a selection of a presentation quality; and selecting the threshold matrix according to the selected presentation quality.

23. The program storage device of claim 19, wherein the threshold matrix is retrieved remotely from the facsimile presentation device.

24. A method of transmitting data to a facsimile presentation device, comprising the steps of:

receiving a presentation job comprising input data associable with at least one input grayscale value;

retrieving at least one of a plurality of threshold matrices, each threshold matrix selected to control a grayscale rendering characteristic of the facsimile presentation device associated with the threshold matrix;

applying the grayscale values to the retrieved threshold matrix to rasterize the input data; and transmitting the rasterized input data to the facsimile presentation device; and wherein the threshold matrix is retrieved remotely from the facsimile presentation device.

25. The method of claim 24, wherein the step of transmitting the data representing the calibrated grayscale values to the facsimile presentation device comprises the steps of:

reducing the rasterized input data to an intermediate format, the intermediate format being one of a number of widely supported formats;

generating device-specific data and device-specific control information for the facsimile presentation device based upon the intermediate format and control information associated with the input data; and transmitting the device-specific data and the device-specific control information to the facsimile presentation device.

26. The method of claim 24, herein the retrieved threshold matrix implements elliptical turn-on pattern.

27. The method of claim 24, further comprising the steps of:

accepting a selection of the facsimile presentation device; and selecting the threshold matrix according to the selected facsimile presentation device.

28. The method of claim 24, further comprising the steps of:

accepting a selection of a presentation quality; and selecting the threshold matrix according to the selected presentation quality.

29. The method of claim 24, wherein the step of receiving the presentation job comprising input data associable with at least one input grayscale value comprises the steps of:

scanning a media to produce input data; and compiling the input data into the presentation job.

30. The method of claim 24, wherein at least one of the threshold matrices is generated by performing the steps of:

rendering gray level patches with the facsimile presentation device, each gray level patch corresponding to a gray level input command i;

measuring the gray level of the rendered patches; and determining the threshold matrix from the input grayscale values and the rendered gray levels.

31. The method of claim 20, wherein the step of determining the threshold matrix comprises steps of:

determining a normalized function $R(i)$ characterizing a relationship between the gray level input commands i and the corresponding measured gray level of the rendered patches; and determining the threshold matrix as $R^{-1}[T(x,y)]$ where $R^{-1}$ denotes the inverse of the function $R(i)$ and $T(x,y)$ defines elements of a nominal threshold matrix.

32. The method of claim 24, wherein the image rendered on the facsimile presentation device emulates a grayscale rendering characteristic of a second presentation device, and at least one of the threshold matrices is generated by performing steps comprising the steps of:

rendering gray level patches with the facsimile presentation device, each gray level patch corresponding to a gray level input value i;

rendering gray level patches with the second presentation device, each gray level patch corresponding to a gray level input value i;

measuring the gray level of the rendered patches;

determining a normalized function $R_1(i)$ and a normalized function $R_2(i)$ such that $R_1(i)$ characterizes a relationship between a gray level input value i and a corresponding gray level rendered by the facsimile presentation device and $R_2(i)$ characterizes a relationship between a gray level input value i and a corresponding measured gray level rendered by the second presentation device; and determining the threshold matrix as $R_1^{-1}R_2[(i)T(x,y)]$ wherein $T(x,y)$ defines elements of a facsimile presentation device threshold matrix.

33. An apparatus for transmitting data to a facsimile presentation device, comprising:

means for receiving a presentation job comprising input data associable with at least one input grayscale value;

means for retrieving at least one of a plurality of threshold matrices, each threshold matrix selected to control a grayscale rendering characteristic of the facsimile presentation device associated with the threshold matrix;

means for applying the grayscale values to the retrieved threshold matrix to rasterize the input data; and means for transmitting the rasterized input data to the facsimile presentation device;

wherein the threshold matrix is retrieved remotely from the facsimile presentation device.

34. The apparatus of claim 33, wherein the means for transmitting the data representing the calibrated grayscale values to the facsimile presentation device comprises:

means for reducing the rasterized input data to an intermediate format, the intermediate format being one of a number of widely supported formats;

means for generating device-specific data and device-specific control information for the facsimile presentation device based upon the intermediate format and control information associated with the input data; and means for transmitting the device-specific data and the device-specific control information to the facsimile presentation device.

35. The apparatus of claim 33, wherein the retrieved threshold matrix implements a substantially elliptical turn-on pattern.

36. The apparatus of claim 33, further comprising:

means for accepting a selection of the facsimile presentation de vice; and means for selecting the threshold matrix according to the selected facsimile presentation device.

37. The apparatus of claim 33, further comprising:

means for accepting a selection of a presentation quality; and means for selecting the threshold matrix according to the selected presentation quality.

38. The apparatus of claim 33, herein the means for receiving the presentation job comprising input data associable with at least one input grayscale value comprises:

means for scanning a media to produce input data; and means for compiling the input data into the presentation job.

39. The apparatus of claim 33, wherein at least one of the threshold matrices is generated by an apparatus comprising:

means for rendering gray level patches with the facsimile presentation device, each gray level patch corresponding to a gray level input value i;

means for measuring the gray level of the rendered patches; and means for determining the threshold matrix from the input grayscale values and the rendered gray levels.

40. The apparatus of claim 39, wherein the means for determining the threshold matrix comprises:

means for determining a normalized function R(i) characterizing a relationship between the gray level input commands i and the corresponding measured gray level of the rendered patches; and means for determining the threshold matrix as $R^{-1}[T(x,y)]$ where $R^{-1}$ denotes the inverse of the function R(i) and T(x,y) defines elements of a nominal threshold matrix.

41. The apparatus of claim 33, wherein the image rendered on the facsimile presentation device emulates a grayscale rendering characteristic of a second presentation device, and the at least one of the threshold matrices is generated by an apparatus comprising:

means for rendering gray level patches with the facsimile presentation device, each gray level patch corresponding to a gray level input value i;

means for rendering gray level patches with the second presentation device, each gray level patch corresponding to a gray level input value i;

means for measuring the gray level of the rendered patches;

means for determining a normalized function $R_1(i)$ and a normalized function $R_2(i)$ such that $R_1(i)$ characterizes a relationship between a gray level input value i and a corresponding gray level rendered by the facsimile presentation device and $R_2(i)$ characterizes a relationship between a gray level input value i and a corresponding measured gray level rendered by the second presentation device; and means for determining the threshold matrix as $R_1^{-1}R_2(i)[T(x,y)]$ wherein T(x,y) defines elements of a facsimile presentation device threshold matrix.

42. A program storage device readable by a computer, tangibly embodying at least one program of instructions executable by the computer to perform method steps of transmitting data to a facsimile presentation device, the method comprising the steps of:

receiving a presentation job comprising input data associable with at least one input grayscale value;

retrieving at least one of a plurality of threshold matrices, each threshold matrix selected to control a grayscale rendering characteristic of the facsimile presentation device associated with the threshold matrix;

applying the grayscale values to a the retrieved threshold matrix to rasterize the input data; and transmitting the rasterized input data to the facsimile presentation device;

wherein the threshold matrix is retrieved remotely from the facsimile presentation device.

43. The program storage device of claim 42, wherein the method step of transmitting the data representing the calibrated grayscale values to the facsimile presentation device comprises the method steps of:

reducing the rasterized input data to an intermediate format, the intermediate format being one of a number of widely supported formats;

generating device-specific data and device-specific control information for the facsimile presentation device based upon the intermediate format and control information associated with the input data; and transmitting the device-specific data and the device-specific control information to the facsimile presentation device.

44. The program storage device of claim 42, wherein the retrieved threshold matrix implements a substantially elliptical turn-on pattern.

45. The program storage device of claim 42, wherein the method steps further comprise the steps of:

accepting a selection of the facsimile presentation device; and selecting the threshold matrix according to the selected facsimile presentation device.

46. The program storage device of claim 42, wherein the method steps further comprise the steps of:

accepting a selection of a presentation quality; and selecting the threshold matrix according to the selected presentation quality.

* * * * *